(12) United States Patent
Kozuka et al.

(10) Patent No.: US 10,984,510 B2
(45) Date of Patent: *Apr. 20, 2021

(54) VIDEO DISPLAY APPARATUS AND VIDEO DISPLAY METHOD FOR LUMINANCE CONVERSION

(71) Applicant: PANASONIC INTELLECTUAL PROPERTY MANAGEMENT CO., LTD., Osaka (JP)

(72) Inventors: Masayuki Kozuka, Osaka (JP); Masaya Yamamoto, Kyoto (JP); Toshiroh Nishio, Osaka (JP); Kazuhiko Kouno, Osaka (JP); Yoshiichiro Kashiwagi, Kyoto (JP); Takeshi Hirota, Osaka (JP); Hiroshi Yahata, Osaka (JP); Yoshihiro Mori, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/333,491

(22) PCT Filed: Feb. 26, 2018

(86) PCT No.: PCT/JP2018/006859
§ 371 (c)(1),
(2) Date: Mar. 14, 2019

(87) PCT Pub. No.: WO2019/008819
PCT Pub. Date: Jan. 10, 2019

(65) Prior Publication Data
US 2019/0251680 A1    Aug. 15, 2019

Related U.S. Application Data

(60) Provisional application No. 62/529,727, filed on Jul. 7, 2017.

(51) Int. Cl.
*G06T 5/00* (2006.01)
*G06T 11/60* (2006.01)
(Continued)

(52) U.S. Cl.
CPC ............. *G06T 5/009* (2013.01); *G06T 5/50* (2013.01); *G06T 11/00* (2013.01); *G06T 11/60* (2013.01);
(Continued)

(58) Field of Classification Search
CPC .......... G06T 5/009; G06T 5/005; G06T 5/006
See application file for complete search history.

(56) References Cited

U.S. PATENT DOCUMENTS 8,218,625 B2 * 7/2012 Ward .................... H04N 19/98
                                                375/240.03
2005/0117813 A1    6/2005 Nishida et al.
(Continued)

FOREIGN PATENT DOCUMENTS

JP       09224222 A   *  8/1997
JP       H09-224222 A     8/1997
(Continued)

OTHER PUBLICATIONS

White Paper Blu-ray Disc Read-Only Format (Ultra HD Blu-ray), Audio Visual Application Format Specifications for BD-ROM Version 3.1, Aug. 2016, http://www.blu-raydisc.com/Assets/Downloadablefile/3DROM_Part3_V3.1_WhitePaper_160729_clean.pdf.

(Continued)

*Primary Examiner* — Terrell M Robinson
(74) *Attorney, Agent, or Firm* — McDermott Will and Emery LLP

(57) ABSTRACT

A video display apparatus includes: a video receiver that acquires video data including a main video; a generator that
(Continued)

generates first characteristics information that indicates first dynamic luminance characteristics by using the video data when a luminance dynamic range format of the main video indicated by the video data is different from a display format that indicates a luminance dynamic range format displayable by the video display apparatus, the first dynamic luminance characteristics being dynamic luminance characteristics indicating a time-dependent change in luminance characteristics of the main video and correspond to the display format; a tone mapping processor that performs a tone mapping process of converting a luminance of the main video based on conversion characteristics according to the first dynamic luminance characteristics indicated by the first characteristics information generated by the generator; and a display that displays the main video that has undergone the tone mapping process.

5 Claims, 29 Drawing Sheets

(51) Int. Cl.
| | |
|---|---|
| G06T 5/50 | (2006.01) |
| G09G 5/00 | (2006.01) |
| G09G 5/02 | (2006.01) |
| G09G 5/10 | (2006.01) |
| G09G 5/397 | (2006.01) |
| H04N 5/66 | (2006.01) |
| H04N 5/20 | (2006.01) |
| H04N 21/431 | (2011.01) |
| G06T 11/00 | (2006.01) |

(52) U.S. Cl.
CPC ............ *G09G 5/005* (2013.01); *G09G 5/006* (2013.01); *G09G 5/026* (2013.01); *G09G 5/10* (2013.01); *G09G 5/397* (2013.01); *H04N 5/20* (2013.01); *H04N 5/66* (2013.01); *H04N 21/431* (2013.01); *G06T 2207/10016* (2013.01); *G06T 2207/20208* (2013.01)

(56) References Cited

U.S. PATENT DOCUMENTS

| | | | |
|---|---|---|---|
| 2009/0252412 A1* | 10/2009 | Matsushita | G06T 5/40 382/167 |
| 2011/0235720 A1 | 9/2011 | Banterle et al. | |
| 2012/0236949 A1 | 9/2012 | Keating et al. | |
| 2012/0314129 A1 | 12/2012 | Mertens | |
| 2013/0208028 A1 | 8/2013 | Shirai et al. | |
| 2014/0044372 A1 | 2/2014 | Mertens | |
| 2014/0210847 A1* | 7/2014 | Knibbeler | H04N 9/68 345/589 |
| 2014/0369410 A1 | 12/2014 | Olivier et al. | |
| 2016/0142695 A1 | 5/2016 | Uchimura et al. | |
| 2016/0163356 A1* | 6/2016 | De Haan | G11B 27/329 386/241 |
| 2016/0173845 A1 | 6/2016 | Uchimura et al. | |
| 2016/0191883 A1 | 6/2016 | Uchimura et al. | |
| 2016/0210730 A1* | 7/2016 | Eto | H04N 19/98 |
| 2016/0212399 A1 | 7/2016 | Uchimura | |
| 2016/0232937 A1 | 8/2016 | Yamamoto et al. | |
| 2016/0292834 A1* | 10/2016 | Tsuru | H04N 9/69 |
| 2016/0330513 A1 | 11/2016 | Toma et al. | |
| 2016/0373712 A1 | 12/2016 | Yamamoto et al. | |
| 2017/0034497 A1 | 2/2017 | Yahata et al. | |
| 2017/0085879 A1 | 3/2017 | Minoo et al. | |
| 2017/0105042 A1 | 4/2017 | Toma et al. | |
| 2018/0218481 A1 | 8/2018 | Evans et al. | |
| 2018/0220101 A1 | 8/2018 | Evans et al. | |
| 2018/0232867 A1* | 8/2018 | Park | G06T 5/50 |
| 2019/0043233 A1 | 2/2019 | Kim et al. | |
| 2019/0251680 A1 | 8/2019 | Kozuka et al. | |

FOREIGN PATENT DOCUMENTS

| | | |
|---|---|---|
| JP | 2014-515202 A | 6/2014 |
| JP | 2017-184249 A | 10/2017 |
| WO | 2013/046095 A1 | 4/2013 |
| WO | 2016/027423 A1 | 2/2016 |

OTHER PUBLICATIONS

Kazuya Orihara, et al., "IFA 2015 Flash Report!—Ultra HD Blu-ray and high-resolution products released one after another!!-", AV Review, Ongen Publishing Co., Ltd., October Issue (Oct. 25, 2015), vol. 32, No. 10, pp. 8-10 with English translation.
International Search Report and Written Opinion issued in International Patent Application No. PCT/JP2018/006858, dated May 15, 2018; with partial English translation.
International Search Report and Written Opinion issued in International Patent Application No. PCT/JP2018/006859, dated May 15, 2018; with partial English translation.
Extended European Search Report dated Apr. 3, 2020 issued for the corresponding European patent application No. 18828821.1.
Extended European Search Report dated Apr. 8, 2020 issued for the related European patent application No. 18828271.9.
Non-Final Office Action issued in U.S. Appl. No. 16/333,507, dated Apr. 8, 2020.
Non-Final Office Action issued in U.S. Appl. No. 16/333,507, dated Sep. 2, 2020.

* cited by examiner

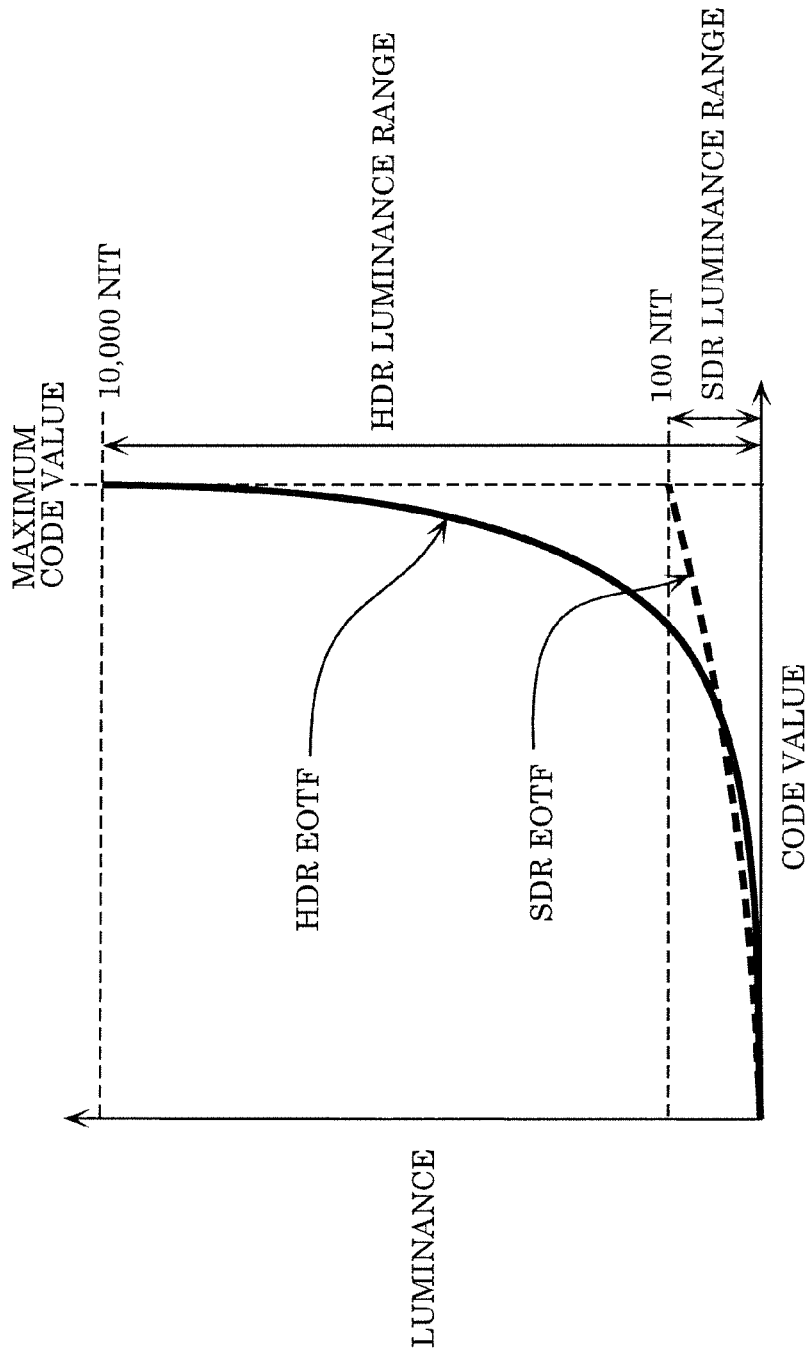

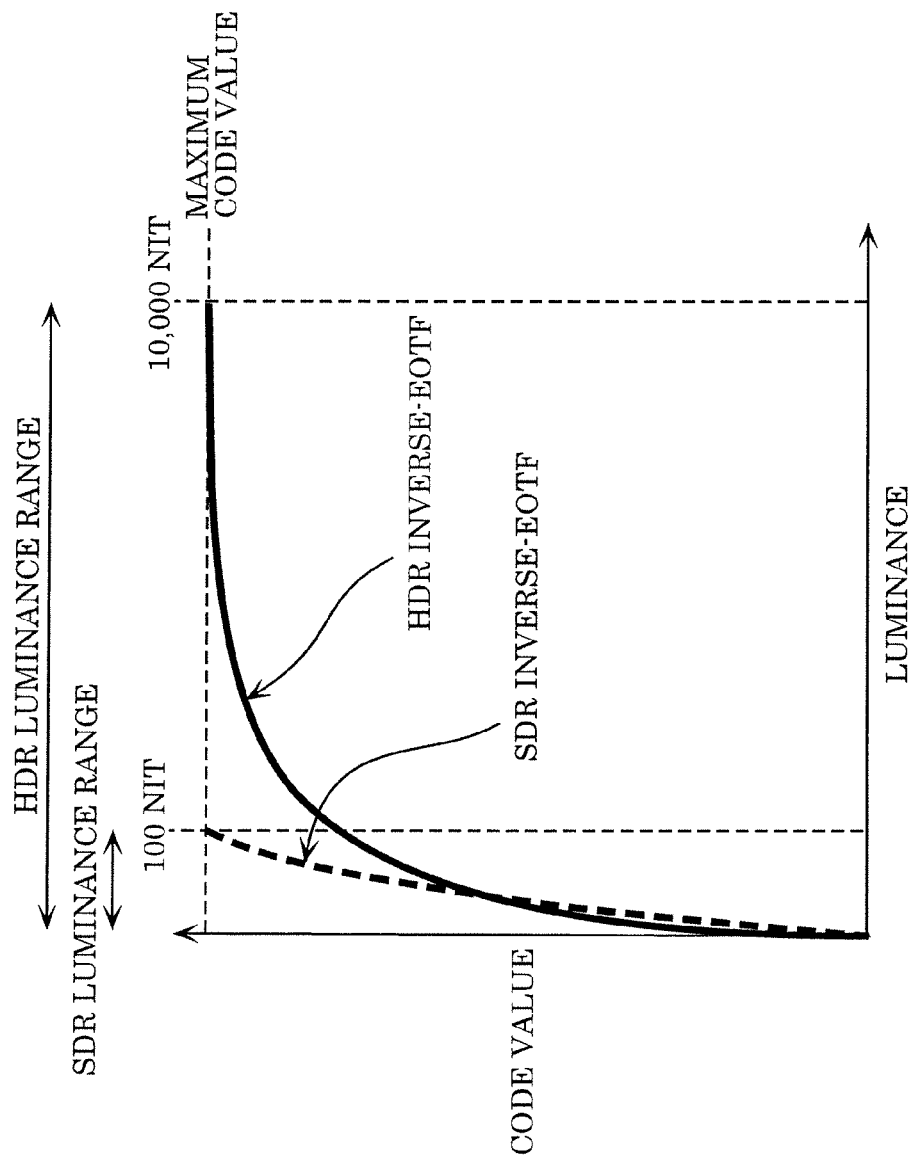

FIG. 9A

| ITEM NAME | EXAMPLE VALUE | COMMENTS |
|---|---|---|
| HDR FORMAT INDICATOR | HDR FORMAT A | VALUE SPECIFIED IN STANDARD OR OPTIONAL SPECIFICATIONS |
| OPTION INDICATOR | FIRST OPTION | SPECIFIED IN HDR FORMAT |
| BASIC TONE MAPPING INFORMATION AVERAGE DATA VALUE | 0X0FF | 12 BIT VALUE |
| BASIC TONE MAPPING INFORMATION DATA VALUE DISTRIBUTION INFORMATION (PREDETERMINED NUMBER) | 0XA01, ETC. | 12 BIT VALUE |

FIG. 9B

| ITEM NAME | EXAMPLE VALUE | COMMENTS |
|---|---|---|
| HDR FORMAT INDICATOR | HDR FORMAT A | VALUE SPECIFIED IN STANDARD OR OPTIONAL SPECIFICATIONS |
| OPTION INDICATOR | SECOND OPTION | SPECIFIED IN HDR FORMAT |
| BASIC TONE MAPPING INFORMATION AVERAGE DATA VALUE | 500 | 12 BIT VALUE |
| BASIC TONE MAPPING INFORMATION DATA VALUE DISTRIBUTION INFORMATION (PREDETERMINED NUMBER) | 700, 300, ETC. | 12 BIT VALUE |

FIG. 12

| ITEM NAME | EXAMPLE VALUE | COMMENTS |
|---|---|---|
| HDR FORMAT INDICATOR | HDR FORMAT A | VALUE SPECIFIED IN STANDARD OR OPTIONAL SPECIFICATIONS |
| MANDATORY TONE MAPPING INFORMATION AVERAGE DATA VALUE | 0x0FF | 12 BIT VALUE |
| OPTION INDICATOR | SECOND OPTION | SPECIFIED IN HDR FORMAT |
| FIRST OPTION TONE MAPPING INFORMATION DATA VALUE DISTRIBUTION INFORMATION (PREDETERMINED NUMBER) | 0XA01, ETC. | 12 BIT VALUE |
| SECOND OPTION TONE MAPPING INFORMATION LUMINANCE VALUE DISTRIBUTION INFORMATION (PREDETERMINED NUMBER) | 700, 300, ETC. | 12 BIT VALUE |

FIG. 21

| ITEM NAME | EXAMPLE VALUE | COMMENTS |
|---|---|---|
| HDR FORMAT INDICATOR | HDR FORMAT A | VALUE SPECIFIED IN STANDARD OR OPTIONAL SPECIFICATIONS |
| MANDATORY TONE MAPPING INFORMATION AVERAGE DATA VALUE | 0x0FF | 12 BIT VALUE |
| OPTION INDICATOR | SECOND OPTION | SPECIFIED IN HDR FORMAT |
| FIRST OPTION TONE MAPPING INFORMATION DATA VALUE DISTRIBUTION INFORMATION (PREDETERMINED NUMBER) | 0XA01, ETC. | 12 BIT VALUE |
| SECOND OPTION TONE MAPPING INFORMATION LUMINANCE VALUE DISTRIBUTION INFORMATION (PREDETERMINED NUMBER) | 700, 300, ETC. | 12 BIT VALUE |
| GRAPHICS LUMINANCE INFORMATION | 300 | 12 BIT VALUE |

VIDEO DISPLAY APPARATUS AND VIDEO DISPLAY METHOD FOR LUMINANCE CONVERSION

CROSS-REFERENCE OF RELATED APPLICATIONS

This application is the U.S. National Phase under 35 U.S.C. § 371 of International Patent Application No. PCT/JP2018/006859, filed on Feb. 26, 2018, which in turn claims the benefit of U.S. Provisional Application No. 62/529,727, filed on Jul. 7, 2017, the entire disclosures of which Applications are incorporated by reference herein.

TECHNICAL FIELD

The present disclosure relates to a video display apparatus and a video display method for processing a video signal.

BACKGROUND ART

Patent Literature (PTL) 1 discloses a display apparatus that updates an HDR signal display method based on dynamic HDR metadata in an HDR (High Dynamic Range) video.

CITATION LIST

Patent Literature

PTL 1: Japanese Unexamined Patent Application Publication No. 2017-184249

Non-Patent Literature

NPL 1: White Paper Blu-ray Disc Read-Only Format (Ultra HD Blu-ray), Audio Visual Application Format Specifications for BD-ROM Version 3.1, August 2016(http://www.blu-raydisc.com/Assets/Downloadablefile/BD-ROM_Part3_V3.1_W hitePaper_160729_clean.pdf)

SUMMARY OF THE INVENTION

Technical Problem

The present disclosure provides a video display apparatus and a video display method that can improve the quality of a video displayed.

Solution To Problem

A video display apparatus according to an aspect of the present disclosure is a video display apparatus including: an acquirer that acquires video data including a main video; a generator that generates first characteristics information that indicates first dynamic luminance characteristics by using the video data when a luminance dynamic range format of the main video indicated by the video data is different from a display format that indicates a luminance dynamic range format displayable by the video display apparatus, the first dynamic luminance characteristics being dynamic luminance characteristics indicating a time-dependent change in luminance characteristics of the main video and correspond to the display format; tone mapping processor that performs a tone mapping process of converting a luminance of the main video based on conversion characteristics according to the first dynamic luminance characteristics indicated by the first characteristics information generated by the generator; and a display that displays the main video that has undergone the tone mapping process.

Advantageous Effect of Invention

The present disclosure can provide a video display apparatus and a video display method that can improve the quality of a video displayed.

BRIEF DESCRIPTION OF DRAWINGS

FIG. 5A is a diagram showing examples of EOTFs (Electro-Optical Transfer Functions) for HDR and SDR.

FIG. 5B is a diagram showing examples of inverse EOTFs for HDR and SDR.

FIG. 9A is a diagram showing a configuration example of dynamic metadata corresponding to a first option.

FIG. 9B is a diagram showing a configuration example of dynamic metadata corresponding to a second option.

FIG. 12 is a diagram showing another configuration example of dynamic metadata.

FIG. 21 is a diagram showing a configuration example of dynamic metadata according to Embodiment 4.

DESCRIPTION OF EXEMPLARY EMBODIMENTS

Figure 1:
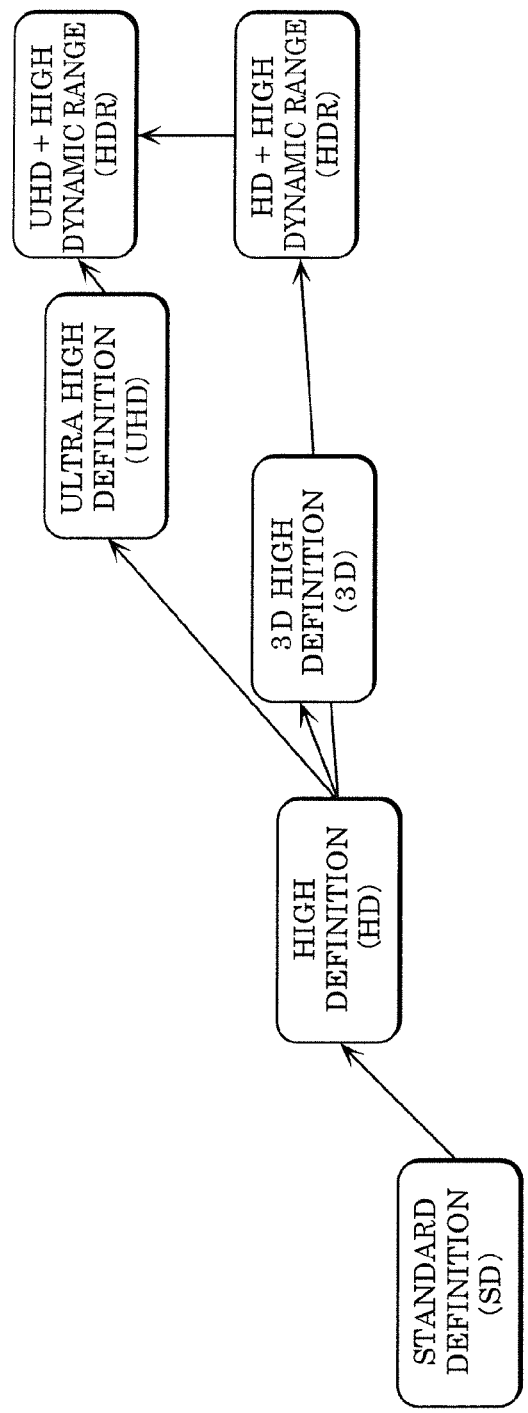
FIG. 1 is a diagram illustrating the evolution of imaging technology.

A video display apparatus according to an aspect of the present invention is a video display apparatus including; an acquirer that acquires video data including a main video; a generator that generates first characteristics information that indicates first dynamic luminance characteristics by using the video data when a luminance dynamic range format of the main video indicated by the video data is different from a display format that indicates a luminance dynamic range format displayable by the video display apparatus, the first dynamic luminance characteristics being dynamic luminance characteristics indicating a time-dependent change in luminance characteristics of the main video and correspond to the display format; tone mapping processor that performs a tone mapping process of converting a luminance of the main video based on conversion characteristics according to the first dynamic luminance characteristics indicated by the first characteristics information generated by the generator; and a display that displays the main video that has undergone the tone mapping process.

Also, the video data may further include second characteristics information that indicates the dynamic luminance characteristics of the main video, and the generator may generate the first characteristics information by converting a luminance dynamic range format of second dynamic luminance characteristics indicated by the second characteristics information to the display format.

Also, the generator may generate the first characteristics information by analyzing the main video of the video data to extract second dynamic luminance characteristics that indicate the dynamic luminance characteristics of the main video, and converting a luminance dynamic range format of the second dynamic luminance characteristics extracted to the display format.

Also, the video display apparatus may further include: a composer that generates a composite video by composing graphics with the main video; and an extractor that extracts luminance characteristics of the graphics. When the composite video is generated by the composer, the tone mapping processor may perform: a first tone mapping process on a first section of the main video in which the first dynamic luminance characteristics indicated by the first characteristics information are greater than or equal to the luminance characteristics of the graphics, the first tone mapping process being processing of dynamically changing the luminance of the main video in the first section based on the conversion characteristics according to the first dynamic luminance characteristics in the first section; and a second tone mapping process on a second section of the main video in which the first dynamic luminance characteristics are less than the luminance characteristics of the graphics, the second tone mapping process being processing of changing the luminance of the main video in the second section based on constant conversion characteristics irrespective of the first dynamic luminance characteristics in the second section.

Also, a video display method according to an aspect of the present invention is a video display method in a video display apparatus, the video display method including: acquiring video data including a main video; generating first characteristics information that indicates first dynamic luminance characteristics by using the video data when a luminance dynamic range format of the main video indicated by the video data is different from a display format that indicates a luminance dynamic range format displayable by the video display apparatus, the first dynamic luminance characteristics being dynamic luminance characteristics that indicate a time-dependent change in luminance characteristics of the main video and correspond to the display format; performing a tone mapping process of converting a luminance of the main video based on conversion characteristics according to the first dynamic luminance characteristics indicated by the first characteristics information generated in the generating of the first characteristics information; and displaying the main video that has undergone the tone mapping process.

1-1. Background

First, the transition of imaging technology will be described with reference to FIG. 1. FIG. 1 is a diagram illustrating the evolution of imaging technology.

In order to enhance video image quality, the focus has been given to increase the number of pixels displayed. Accordingly, standard definition (SD) videos (720×480 pixels) and high definition (HD) videos (1920×1080 pixels) are now widely used.

In recent years, in order to achieve even higher image quality, introduction of ultra-high definition (UHD) videos (3840×1920 pixels), or so-called 4K resolution videos (with a 4K resolution of 4096×2048 pixels) has started.

Along with the introduction of 4K resolution videos, consideration is also given to expanding the dynamic range, expanding the color gamut, adding or improving the frame rate, and the like.

Among these, with respect to the dynamic range, HDR (High Dynamic Range) rendering is receiving increased attention as a method for representing bright light, such as specular reflection light, that cannot be represented by a currently used television signal to be more close to reality while maintaininglow light signal gradation. Specifically, conventional television signals are called SDR (Standard Dynamic Range) signals, and the highest luminance is 100 nits. In contrast, in HDR signals, the highest luminance is expected to be up to 1000 nits or more. For HDR signals, standardization of mastering display standards is currently undertaken by SMPTE (Society of Motion Picture & Television Engineers), ITU-R (International Telecommunications Union Radio communications Sector), and the like.

Specific applications of HDR include, as with HD and UHD, broadcasting, packaged media (Blu-ray® disc, and the like), internet delivery, and the like.

1-2. Relationship Between Generation of Master, Delivery Methods, and Display Apparatuses FIG. 2 is a diagram illustrating the relationship between video production, delivery methods, and display apparatuses when a new video representation is introduced into content.

Figure 2:
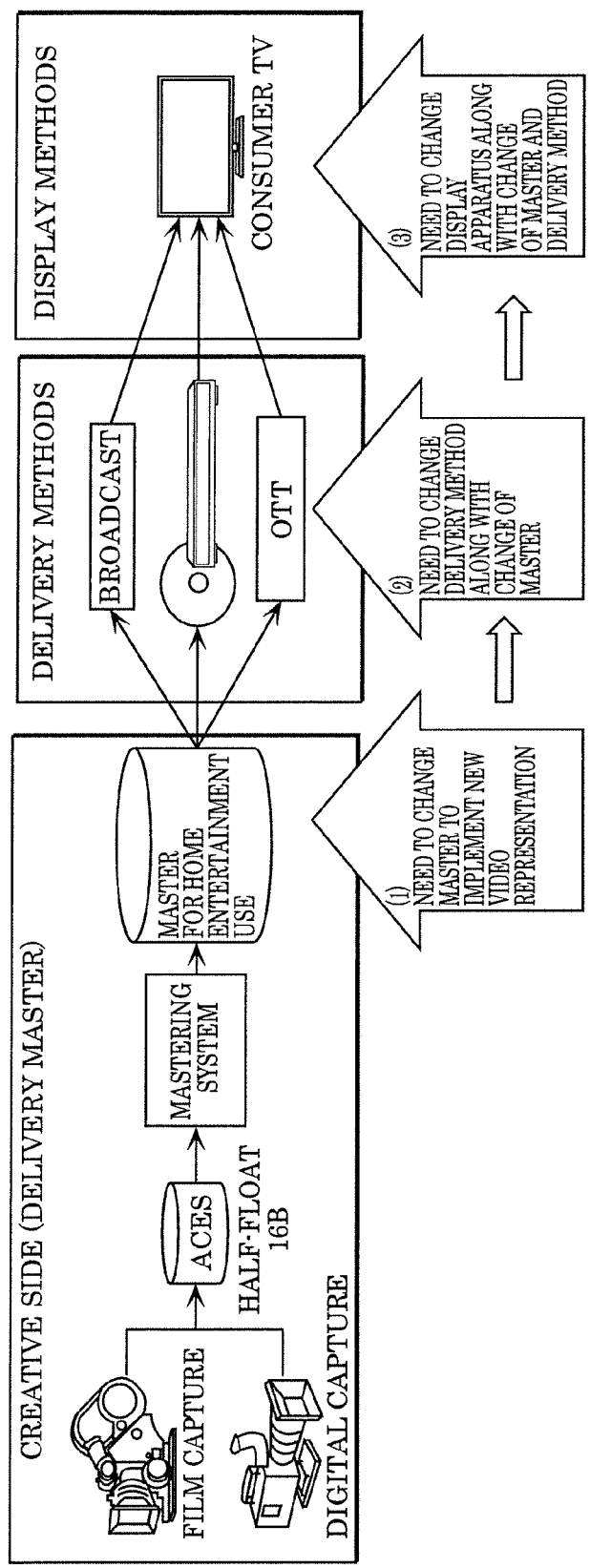
FIG. 2 is a diagram illustrating the relationship between video production, delivery methods, and display apparatuses when a new video representation is introduced into content.

In the case where a new video representation is introduced (for example, the number of pixels is increased) so as to enhance video image quality, as shown in FIG. 2, it is necessary to (1) change a master for home entertainment on the video production side. Along with this change, it is also necessary to (2) update the delivery method such as broadcasting, communication, or a packaged medium, and also (3) update the display apparatus such as a television set or a projector for displaying the video.

1-3. Tone Mapping

Tone mapping is processing for adjusting, based on the relationship between the luminance of an HDR video and the maximum luminance (Display Peak Luminance: DPL) of a video display apparatus, the luminance of the video to be less than or equal to DPL by converting the luminance of the video if the maximum luminance (Maximum Content Luminance Level: MaxCLL) of the video exceeds DPL. Through this processing, the video can be displayed without losing information near the maximum luminance of the video. The conversion depends on the characteristics of the video display apparatus, and also depends on how to display the video, and thus different conversion characteristics are used for each video display apparatus.

Figure 3A:
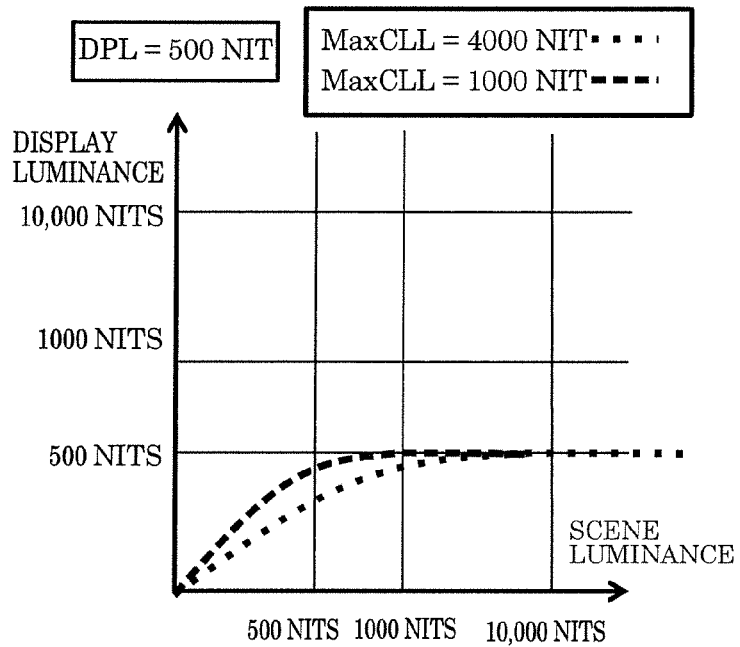
FIG. 3A is a diagram showing an example of tone mapping.
Figure 3B:
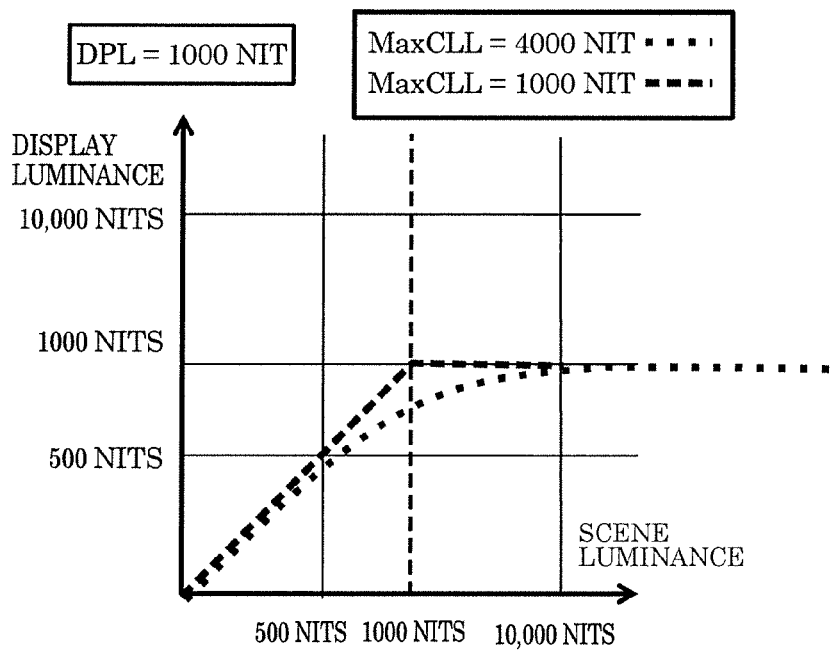
FIG. 3B is a diagram showing an example of tone mapping.

FIGS. 3A and 3B are diagrams showing examples of tone mapping. FIG. 3A shows a case where DPL is 500 nits, and FIG. 3B shows a case where DPL is 1000 nits. Also, FIGS. 3A and 3B each show an example of tone mapping performed when a video having a MaxCLL of 1000 nits is displayed and an example of tone mapping performed when a video having a MaxCLL of 4000 nits is displayed.

As shown in FIG. 3A, in the case where DPL is 500 nits, in both videos, the luminance is converted such that the video can be displayed at up to MaxCLL below 500 nits, but the degree of conversion is higher in the video having a higher MaxCLL.

As shown in FIG. 3B, in the case where DPL is 1000 nits, in the video having a MaxCLL of 1000 nits, tone mapping is not performed. In the video having a MaxCLL of 4000 nits, tone mapping is performed so as to convert the luminance from 4000 nits to 1000 nits, and the video is displayed at that luminance.

1-4. Dynamic Metadata and Dynamic Tone Mapping

Figure 4A:
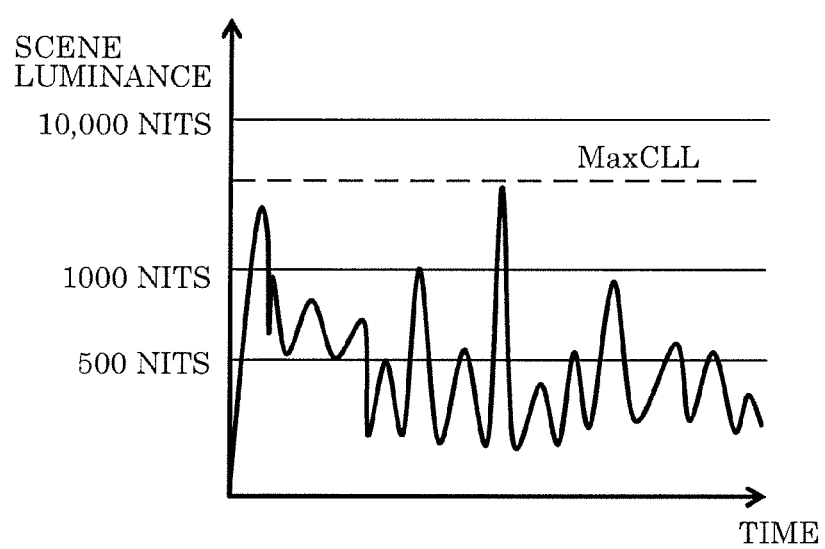
FIG. 4A is a diagram showing an example of static tone mapping.
Figure 4B:
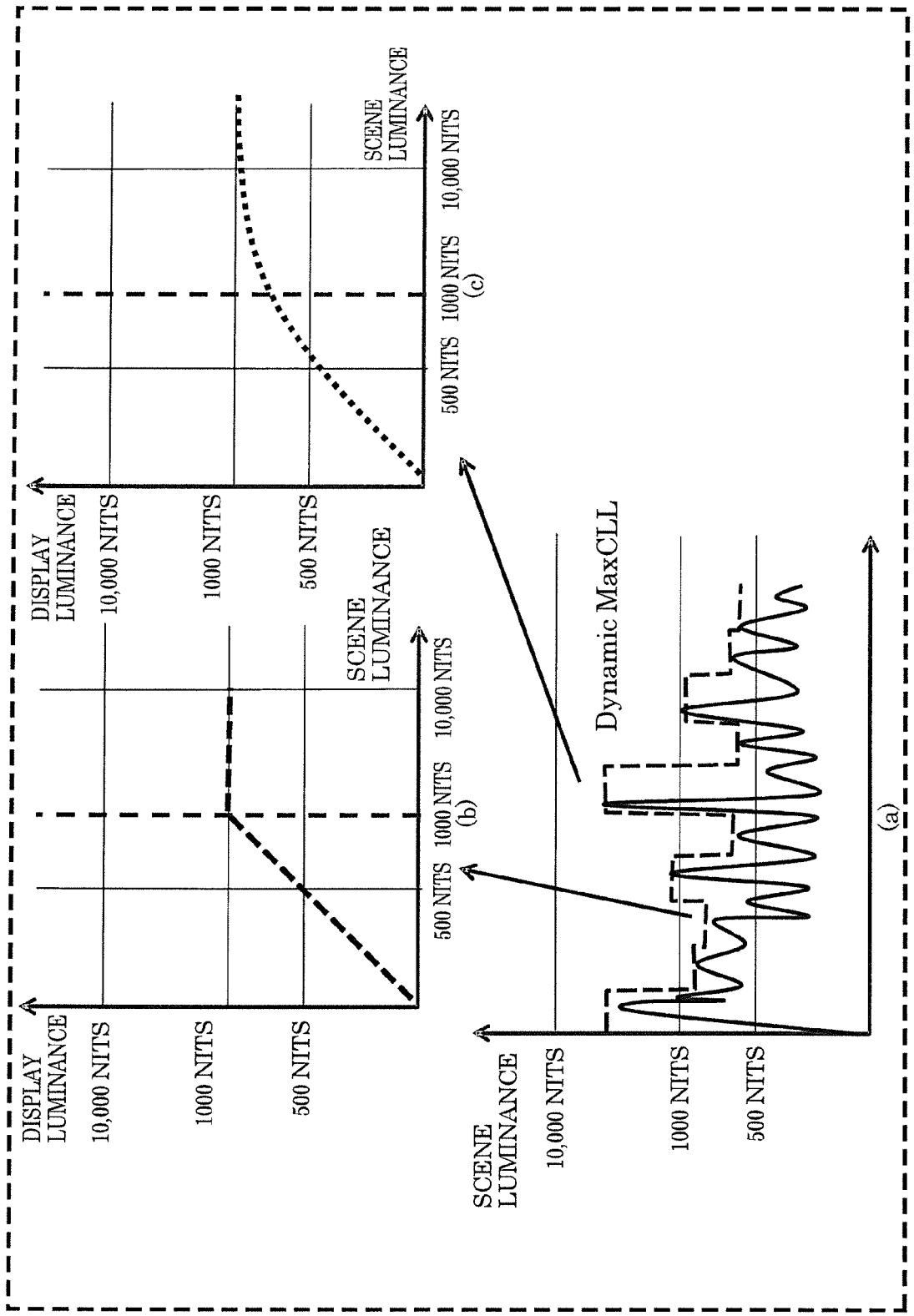
FIG. 4B is a diagram showing an example of dynamic tone mapping.

FIG. 4A is a diagram showing an example of tone mapping using static metadata. FIG. 4B is a diagram showing an example of dynamic tone mapping using dynamic metadata.

As shown in FIG. 4A, in the case where static metadata (MaxCLL) is used, MaxCLL indicates the highest luminance in a video sequence, and thus the video display apparatus can only perform tone mapping using a fixed curve on the video sequence. In contrast, as shown in (a) in FIG. 4B, in the case where metadata suitable according to the luminance that varies with time (here, referred to as Dynamic MaxCLL) is used, the video display apparatus does not perform tone mapping when the luminance is low ((b) in FIG. 4B), and performs tone mapping when the luminance is high ((c) in FIG. 4B). In this way, optimal tone mapping suitable for the luminance that varies with time can be implemented. Dynamic metadata describes the dynamic luminance characteristics that indicate a time-dependent change in the luminance characteristics of the video. The luminance characteristics of the video used in the dynamic metadata may be, for example, the maximum luminance, the average luminance, or the like of each predetermined section of the video. The present disclosure will be described by taking the maximum luminance of the video as an example of the luminance characteristics of the video. As used herein, the term "predetermined section of the video" refers to, for example, a scene, a chapter, a frame, or the like.

1-5. EOTF

Here, EOTF will be described with reference to FIGS. 5A and 5B.

FIG. 5A is a diagram showing examples of EOTFs (Electro-Optical Transfer Functions) for HDR and SDR.

In general, EOTF is what is called a "gamma curve", which indicates the correspondence between code values and luminance values so as to convert a code value to a luminance value. That is, EOTF is relationship information that indicates the correspondence relationship between a plurality of code values and luminance values.

Also, FIG. 5B is a diagram showing examples of inverse EOTFs for HDR and SDR.

Inverse EOTF indicates the correspondence between the luminance value and the code value, and is used to convert the luminance value to the code value by quantizing the luminance value inversely to EOTF. That is, inverse EOTF is relationship information that indicates the correspondence relationship between luminance values and a plurality of code values. For example, in the case where the luminance values of an HDR-compatible video are represented by code values on a 10 bit gray scale, luminance values in an HDR luminance range of up to 10000 nits are quantized and mapped to 1024 integer values ranging from 0 to 1023. That is, by performing quantization based on the inverse EOTF, a luminance value in a luminance range of 0 to 10000 nits (the luminance values of the HDR-compatible video) is converted to an HDR signal with 10-bit code value. With HDR-compatible EOTF (hereinafter referred to as "HDR EOTF") or HDR-compatible inverse EOTF (hereinafter referred to as "HDR inverse-EOTF"), it is possible to represent higher luminance values higher than those of SDR-compatible EOTF (hereinafter referred to as "SDR EOTF") or SDR-compatible inverse EOTF (hereinafter referred to as SDR inverse-EOTF). For example, in FIGS. 5A and 5B, the maximum luminance value (peak luminance) is 10000 nits. That is, the HDR luminance range includes the entire SDR luminance range, and the HDR peak luminance is higher than the SDR peak luminance. The HDR luminance range is a luminance range in which the maximum value is increased from 100 nits, which is the maximum value of the SDR luminance range, to 10000 nits.

For example, an example of the HDR EOTF and the HDR inverse-EOTF includes SMPTE 2084 standardized by the Society of Motion Picture and Television Engineers (SMPTE) founded in the United States.

1-6. Overlaying Graphics on Video

Figure 6:
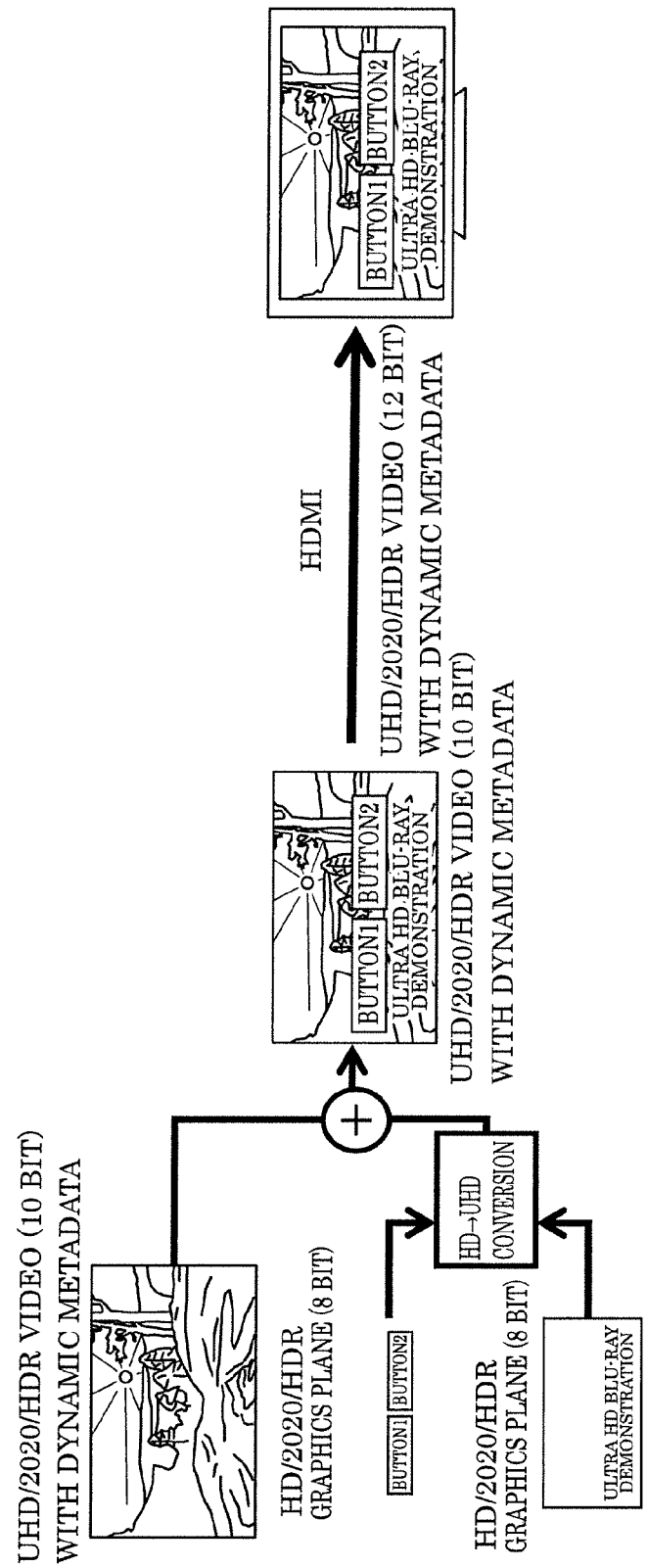
FIG. 6 is a diagram showing an example in which graphics are overlaid on a moving image, and the resulting moving image is displayed.

FIG. 6 is a diagram showing an example in which graphics such as a menu and subtitles are overlaid on a moving image, and the moving image is displayed on a video display apparatus. Here, an example of Ultra HD Blu-ray is shown.

A set of moving images before graphics are overlaid will be referred to as a main video. With Ultra HD Blu-ray, graphics are prepared in HD resolution. A video reproduction apparatus performs HD-UHD conversion on the graphics in HD resolution so as to generate graphics in UHD resolution. Then, the video reproduction apparatus overlays the obtained graphics in UHD resolution with the main video having UHD resolution. Then, the video reproduction apparatus transmits the video resulting from the overlay process to a video display apparatus via HDMI® (High-Definition Multimedia Interface). The video display apparatus displays the transmitted video in HDR.

Also, the video reproduction apparatus determines dynamic metadata based on the variation of the luminance of the main video with time, and transmits the dynamic metadata to the video display apparatus via HDMI. The video display apparatus performs dynamic tone mapping on a video signal of the video obtained by overlaying subtitles and menus on the main video based on the transmitted dynamic metadata.

The same applies to an HDR video that is displayed through an OTT (over the top) service via broadcasting or communication and in which a menu or subtitles are overlaid on a main video, and the resulting video is displayed on a video display apparatus.

1-7. Problem Arising When Performing Dynamic Tone Mapping on Video Data where Graphics are Overlaid on Moving Image In the dynamic metadata method, metadata regarding the luminance of the HDR video such as luminance distribution is designated for each frame, and the metadata is transmitted to the video display apparatus together with the video signal. The video display apparatus performs processing such as luminance conversion based on the transmitted metadata according to the display capabilities of the video display apparatus such as maximum luminance. The dynamic metadata method as described above is receiving increased attention as a method for displaying a video at a constant quality as much as possible irrespective of the display performance of a video display apparatus such as luminance.

However, dynamic metadata varies with time, and thus there is a problem in that a video that needs to be displayed stably is not displayed stably.

If the video to be displayed is a video or a set of so-called moving images that is simultaneously edited or supervised, processing can be performed considering the state of the video to some degree. When graphics data such as subtitles or a menu whose luminance is essentially constant and does not vary at all is overlaid on a main video composed of a set of moving images as described above and displayed, due to the processing that uses dynamic metadata, a negative effect occurs such as variation of the luminance or color of the graphics that essentially needs to be constant. This negative effect becomes more prominent as the luminance of the main video is higher and the luminance of the video display apparatus is lower.

Figure 7:
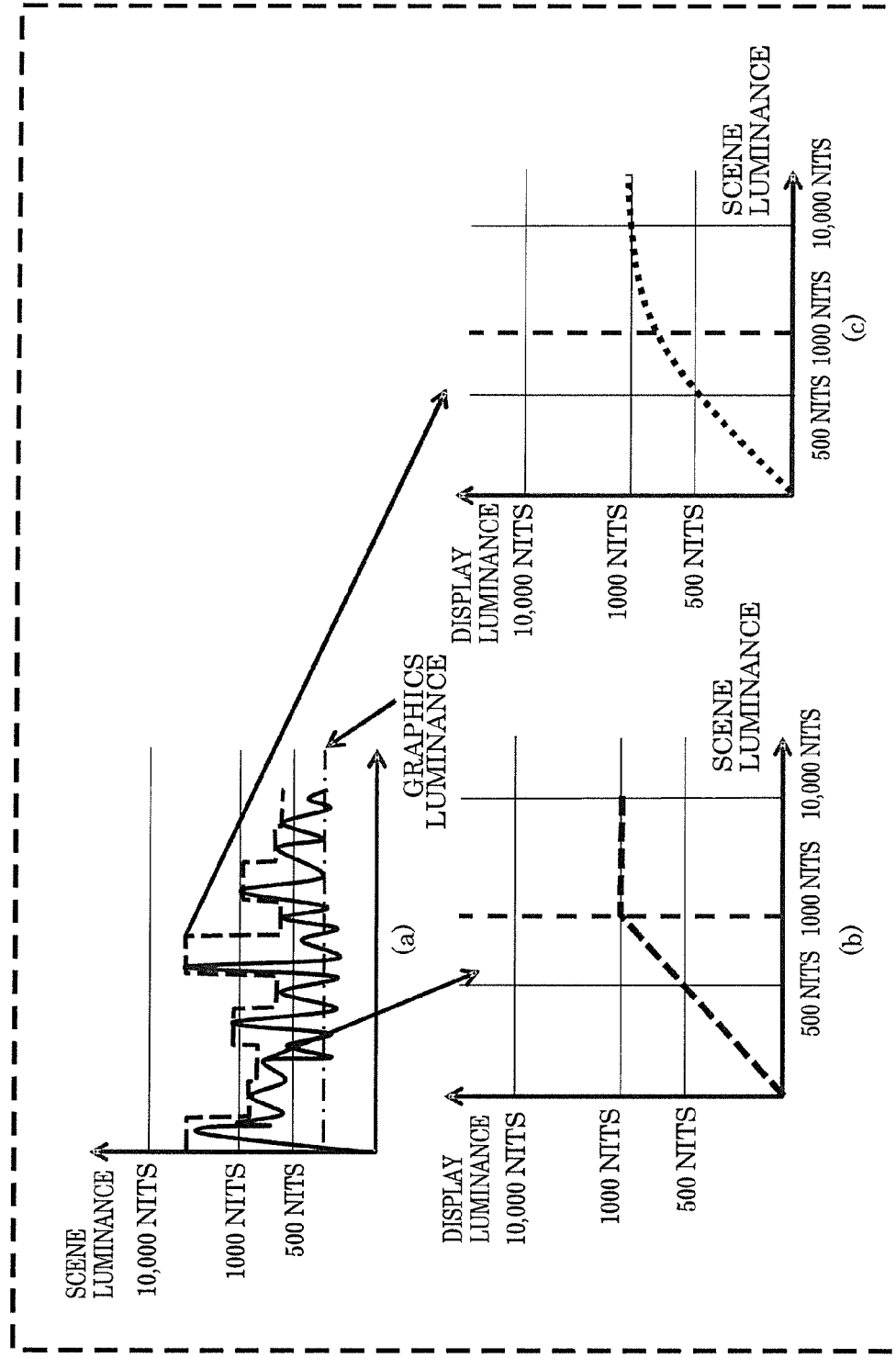
FIG. 7 is a diagram showing the influence of dynamic tone mapping when graphics are overlaid on a main video.

FIG. 7 is a diagram showing the influence of dynamic tone mapping when graphics are overlaid on a main video. It is assumed here that, as shown in (a) in FIG. 7, graphics to be overlaid has a luminance of 350 nits. As shown in (b) in FIG. 7, in a section of the main video that has a low luminance, tone mapping is not performed, and thus the graphics are displayed on a video display apparatus at a luminance of 350 nits that is the original luminance of the graphics. On the other hand, as shown in (c) in FIG. 7, in a section of the main video that has a high luminance, tone mapping is performed, and thus the graphics are displayed on the video display apparatus at a luminance lower than 350 nits. In this way, the graphics luminance that essentially needs to be constant varies with time, resulting in an undesired state. In this example, only the influence on the luminance is considered, but in an actual video display apparatus, the influence may also be exerted on color components, and thus colors may also be affected.

1-8. Example of HDR Format Checking Method

At present, some HDR formats in which dynamic tone mapping can be performed are currently proposed and standardized. An HDR format is an example of a luminance dynamic range format. Accordingly, the video reproduction apparatus needs to check which HDR format each of the main video, the video reproduction apparatus, and the video display apparatus supports, reproduce the main video supported by the video display apparatus and output the reproduced main video to the video display apparatus.

Figure 8A:
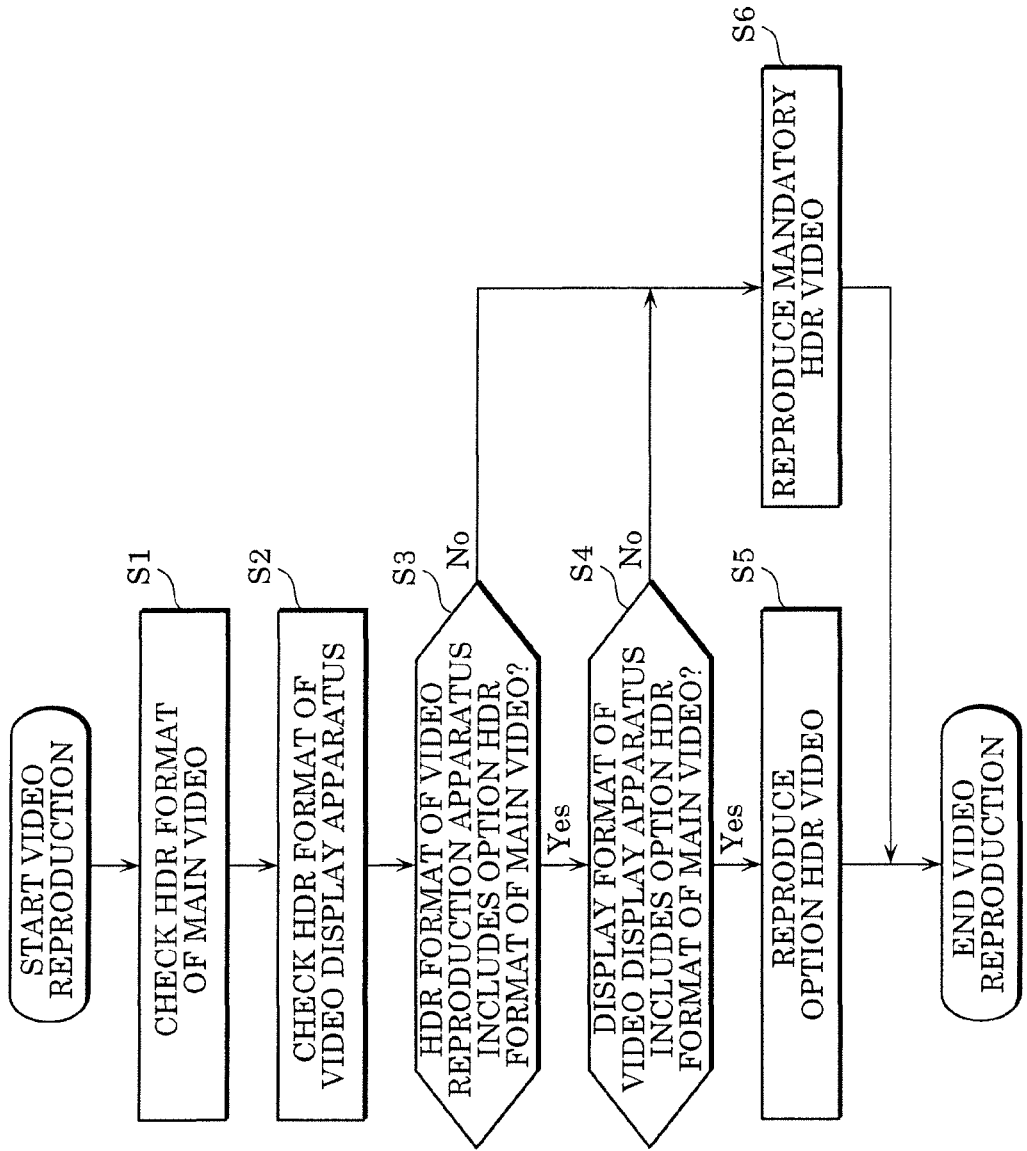
FIG. 8A is a main flowchart showing an example of an HDR format checking method.
Figure 8B:
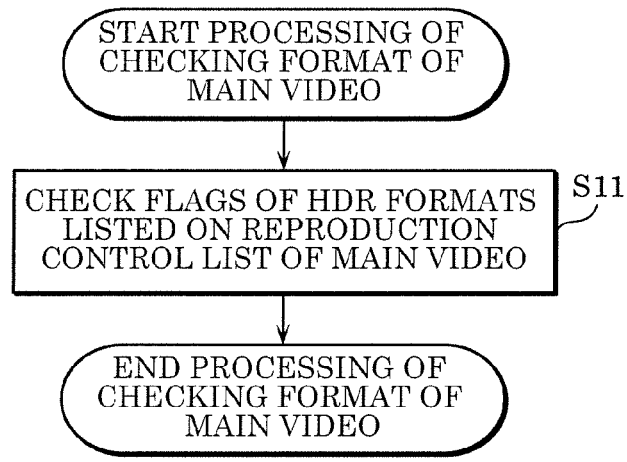
FIG. 8B is a sub-flowchart of the main flowchart shown in FIG. 8A illustrating an example of a format checking method for checking the format of a main video.
Figure 8C:
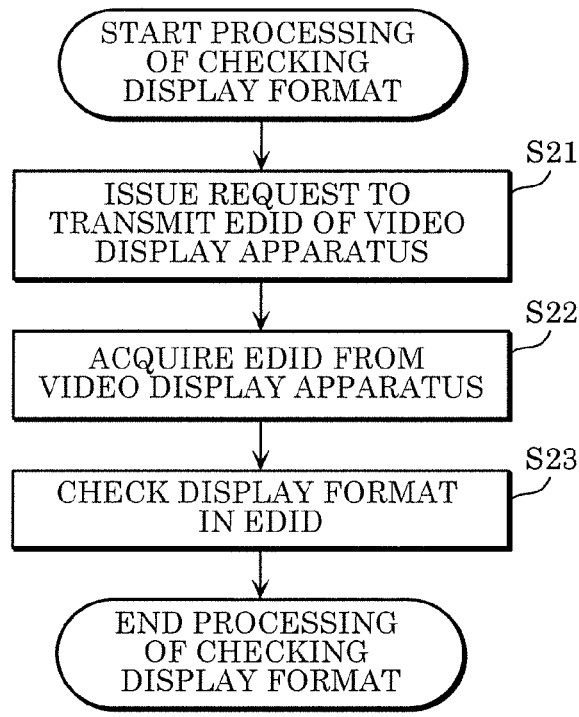
FIG. 8C is a sub-flowchart of the main flowchart shown in FIG. 8A illustrating an example of a format checking method for checking the format of a video display apparatus.

FIGS. 8A to 8C are flowcharts illustrating an example of an HDR format checking method. FIG. 8A is a main flowchart illustrating an example of an HDR format checking method. FIG. 8B is a sub-flowchart of the main flowchart shown in FIG. 8A illustrating an example of a format checking method for checking the format supported by the main video. FIG. 8C is a sub-flowchart of the main flowchart shown in FIG. 8A illustrating an example of a format checking method for checking the format supported by the video display apparatus.

In an Ultra HD Blu-ray disc, Mandatory HDR and a plurality of Option HDRs are specified as HDR formats. Accordingly, in an Ultra HD Blu-ray disc, a main video that supports only Mandatory HDR, or a main video that supports Mandatory HDR and Option HDR is recorded. In the case where Option HDR is recorded, at least one of the plurality of Option HDRs is recorded. Option HDR videos are higher quality videos than Mandatory HDR videos.

As shown in FIG. 8A, the video reproduction apparatus first checks the luminance dynamic range format of the main video (S1).

Specifically, as shown in FIG. 8B, the video reproduction apparatus checks the flags of the HDR formats listed on a reproduction control list of the main video (S11. In this way, the video reproduction apparatus checks the flags of the HDR formats and determines the HDR format supported by the main video.

Next, the video reproduction apparatus checks the HDR format (hereinafter referred to as "display format") supported by the video display apparatus (S2). That is, the video reproduction apparatus checks the display format that is the luminance dynamic range format displayable by the video display apparatus.

Specifically, as shown in FIG. 8C, the video reproduction apparatus issues a request to transmit EDID of the video display apparatus to the video display apparatus via HDMI (S21).

Next, the video reproduction apparatus acquires EDID of the video display apparatus from the video display apparatus via HDMI (S22).

Then, the video reproduction apparatus checks the acquired EDID for the display format of the video display apparatus (S23).

In this way, by performing steps S1 and S2, the video reproduction apparatus checks, before it reproduces the main video, the HDR format supported by the main video and the HDR format supported by the video display apparatus to which the video reproduction apparatus is connected. That is, here, the video reproduction apparatus checks the Option HDR.

After that, referring back to FIG. 8A, the video reproduction apparatus determines whether or not the HDR format supported by the video reproduction apparatus includes the Option HDR of the main video (S3).

If it is determined that the HDR format supported by the video reproduction apparatus includes the Option HDR of the main video (Yes in S3), the video reproduction apparatus determines whether or not the display format of the video display apparatus includes the Option HDR of the main video (S4). In this case, in step S4, a determination is made with respect to the HDR format supported by the video reproduction apparatus and the Option HDR included in the main video in step S3.

If it is determined that the display format of the video display apparatus includes the Option HDR of the main video (Yes in S4), the video reproduction apparatus reproduces the main video in the Option HDR (S5). That is, if all of the main video, the video reproduction apparatus, and the video display apparatus support the same Option HDR, the video reproduction apparatus reproduces the main video in that Option HDR.

If, on the other hand, it is determined that the HDR format supported by the video reproduction apparatus does not include the Option HDR of the main video (No in S3), or if it is determined that the display format of the video display apparatus does not include the Option HDR of the main video (No in S4), the video reproduction apparatus reproduces the main video in Mandatory HDR. That is, if any one of the main video, the video reproduction apparatus, and the video display apparatus does not support the Option HDR, the video reproduction apparatus reproduces in Mandatory HDR. It is assumed that HDR-compatible devices support Mandatory HDR.

1-9. Problems Arising When Performing Dynamic Tone Mapping in Plurality of HDR Formats (Problem 1)

As described above, in the case where a video reproduction apparatus and a video display apparatus, which do not support Option HDRs, are connected to each other, the main video is reproduced and displayed in Mandatory HDR, and thus there is a problem in that it is not possible to perform dynamic tone mapping. Also, in each Option HDR, some parameters are defined. If there are further options in the parameters, a situation may arise in which a first option is recorded in the main video data, but the video display apparatus does not support the first option, but supports a second option that is different from the first option. However, in such a situation, despite the fact that the main video, the video reproduction apparatus, and the video display apparatus support an Option HDR format, it is not possible to display the video in the Option HDR format depending on the options of the parameters of the Option HDR. Accordingly, in such a video processing system, the main video is reproduced and displayed in Mandatory HDR, and it is therefore not possible to perform dynamic tone mapping. Alternatively, processing is performed only on the mandatory portion of the Option HDR, and thus dynamic tone mapping poorer than desired is performed, and the video is displayed with poor quality.

FIGS. 9A and 9B show examples of different options in an Option HDR.

FIG. 9A is a diagram showing a configuration example of dynamic metadata corresponding to a first option. FIG. 9B is a diagram showing a configuration example of dynamic metadata corresponding to a second option. In FIGS. 9A and 9B, illustration of the elements that are not relevant to the present disclosure is omitted.

As shown in the diagrams, in the first option, for example, the average data value and the value of data value distribution information of the basic tone mapping information are defined by data values. On the other hand, in the second option, they are defined by luminance values. Also, although not shown here, there may be cases where values are expressed in the same unit and have the same definition but the number of values is different. Also, data values or luminance values such as the average data value and the value of data value distribution information of the basic tone mapping information may be expressed in values converted in nit, which is a unit of brightness.

(Problem 2)

In the case of metadata based on data values such as an example of dynamic metadata corresponding to the first option shown in FIG. 9A, it is difficult to perform processing based on the luminance of graphics overlaid on the main video.

Specifically, in the case where, depending on the graphics luminance, dynamic tone mapping is not performed when the luminance is lower than or equal to the graphics luminance, because the metadata corresponding to the first option is based on data values, or in other words, RGB values, rather than luminance information, the means that performs dynamic tone mapping needs to perform processing such that the graphics luminance information of the graphics and the luminance information of the metadata are expressed in the same unit. In the case of a Blu-ray disc, in particular, the graphics data on the disc include luminance information and color information, rather than RGB values, and it is therefore more difficult to perform the processing.

(Problem 3)

Problem 1 is the problem caused when one Option HDR format includes a plurality of options, but even if the reproduction apparatus supports a plurality of HDR formats in which dynamic tone mapping can be performed, if the video display apparatus does not support a first HDR format supported by the main video to be reproduced, (i) it is not possible to display the video in the first HDR format. Alternatively, if the first HDR format supported by the main video to be reproduced is Option HDR, and the main video includes Mandatory HDR, (ii) the main video is displayed only in the Mandatory HDR format. Accordingly, in such a video processing system, there is a problem in that it is not possible to implement dynamic tone mapping that is a feature of the Option HDR.

1-10. Solution

In the present disclosure, the following solutions are used.

A first method, which is a method for solving Problem 1, will be described. In the first method, in the case where a video display apparatus connected to a video reproduction apparatus via a video signal transmitting means such as an HDMI cable does not support a first option of a predetermined HDR format, but supports a second option of the predetermined HDR format, the video reproduction apparatus generates a second option portion from a first option portion of the dynamic metadata acquired from the main video to be reproduced by the video reproduction apparatus. Then, the video reproduction apparatus (i) replaces the first option portion of the acquired dynamic metadata with the generated second option portion; or (ii) adds the generated second option portion to the acquired dynamic metadata. After that, the video reproduction apparatus transmits the dynamic metadata including the second option portion to the video display apparatus via the video signal transmitting means. The video display apparatus acquires the dynamic metadata including the second option portion, and executes dynamic tone mapping according to the second option of the predetermined HDR format by using the second option portion of the acquired dynamic metadata.

Next, a second method, which is a method for solving Problem 1, will be described. In the second method, in the case where a video display apparatus connected to a video reproduction apparatus via a video signal transmitting means such as an HDMI cable does not support a first option of a predetermined HDR format, but supports a second option of the predetermined HDR format, the video reproduction apparatus generates a second option portion of dynamic metadata from the main video to be reproduced by the video reproduction apparatus. Then, the video reproduction apparatus (i) replaces a first option portion of the dynamic metadata of the main video with the generated second option portion; or (ii) adds the generated second option portion to the acquired dynamic metadata. After that, the video reproduction apparatus transmits the dynamic metadata including the second option portion to the video display apparatus via the video signal transmitting means. The video display apparatus acquires the dynamic metadata including the second option portion, and executes dynamic tone mapping according to the second option of the predetermined HDR format by using the second portion of the acquired dynamic metadata.

Next, a third method, which is a method for solving Problem 1, will be described. In the third method, the function of generating the second option portion from the first option portion, which was explained in the first method, or the function of generating the second option portion from the main video, which was explained in the second method, is provided to the video display apparatus. That is, in the case where a video display apparatus connected to a video reproduction apparatus via a video signal transmitting means such as an HDMI cable does not have the display processing function of displaying a main video corresponding to a first option of a predetermined HDR format, but has the processing function of processing a main video corresponding to a second option of the predetermined HDR format, the video reproduction apparatus reproduces the main video corresponding to the first option, and outputs a reproduction signal of the main video. The video display (i) generates a second option portion from a first option portion of dynamic metadata transmitted together with the main video, (ii) generates a second option portion from the main video, or generating a second option portion by using both methods (i) and (ii). Then, the video display apparatus executes dynamic tone mapping by using the generated second option portion.

Next, a fourth method, which is a method for solving Problem 2, will be described. In the fourth method, in addition to the first method or the second method, the video reproduction apparatus performs inclusion of graphics luminance information at the time of generating the second option portion of the dynamic metadata. That is, the video reproduction apparatus adds, to the second option portion, graphics luminance information of the graphics to be overlaid on the main video. The video display apparatus acquires the dynamic metadata including the second option portion, and performs, on a section in which the luminance of the main video corresponding to the second option is greater than or equal to the graphics luminance, a first tone mapping process of dynamically changing conversion characteristics according to the second option portion of that section by using the acquired dynamic metadata, and performs a second tone mapping process that uses constant conversion characteristics on a section in which the luminance of the main video corresponding to the second option is less (darker) than the graphics luminance.

Next, a fifth method, which is a method for solving Problem 3, will be described. In the fifth method, a case will be considered in which the video reproduction apparatus supports a plurality of HDR formats in which dynamic tone mapping can be performed. In the case where the main video supports a first HDR format that is one of a plurality of HDR formats, and the video display apparatus connected to the video reproduction apparatus supports a second HDR format that is another one of the plurality of HDR formats, at the time of reproducing the main video, the video reproduction apparatus dynamically generates, from the main video that is being reproduced, dynamic metadata that is needed in the second HDR format supported by the video display apparatus, and transmits the generated dynamic metadata to the video display apparatus. As a result, the video display apparatus acquires the main video and the dynamic metadata corresponding to the second HDR format, and displays the acquired main video in the second HDR format by using the acquired dynamic metadata.

With the method described above, with respect to an HDR video signal transmitted via broadcasting, a packaged medium such as a Blu-ray disc, or internet delivery such as OTT, in the case where there are a plurality of options in an HDR format in which dynamic tone mapping can be performed and that is supported by the HDR video signal, and the HDR video signal supports the first option, and the video display apparatus does not support the first option, but supports the second option, the video reproduction apparatus generates a second option portion from the first option portion of the dynamic metadata or the HDR video signal, and transmits the dynamic metadata including the second option portion to the video display apparatus. Accordingly, the video display apparatus can implement dynamic tone mapping provided by the HDR format by using the second option portion supported by the video display apparatus.

Also, when performing dynamic tone mapping, the video display apparatus can, by using the second option, reduce the influence of the dynamic tone mapping on graphics such as a menu and subtitles, with which it is difficult to cope by using the first option, and thus can display subtitles and a menu in a stable manner.

Also, in the case where there are a plurality of HDR formats in which dynamic tone mapping can be performed, and the HDR video signal supports a first HDR format, and the video display apparatus supports a second HDR format, the video reproduction apparatus generates dynamic metadata in the second HDR format from the first HDR format or the HDR video signal. Accordingly, the video display apparatus can implement dynamic tone mapping in the second HDR format.

2. Embodiment 1

In the present embodiment, in the case where a video display apparatus connected to a video reproduction apparatus via a video signal transmitting means such as an HDMI cable does not support a first option of a predetermined HDR format, but supports a second option of the predetermined HDR format, the video reproduction apparatus generates a second option portion from a first option portion of dynamic metadata acquired from a main video to be reproduced, and (i) replaces the first option portion of the acquired dynamic metadata with the generated second option portion; or (ii) adds the second option portion to the acquired dynamic metadata. After that, the video reproduction apparatus transmits the dynamic metadata including the second option portion to the video display apparatus via the video signal transmitting means. The video display apparatus acquires the dynamic metadata including the second option portion, and executes dynamic tone mapping according to the second option of the predetermined HDR format by using the second portion of the acquired dynamic metadata.

2-1. Configuration of Video Processing System

Figure 10:
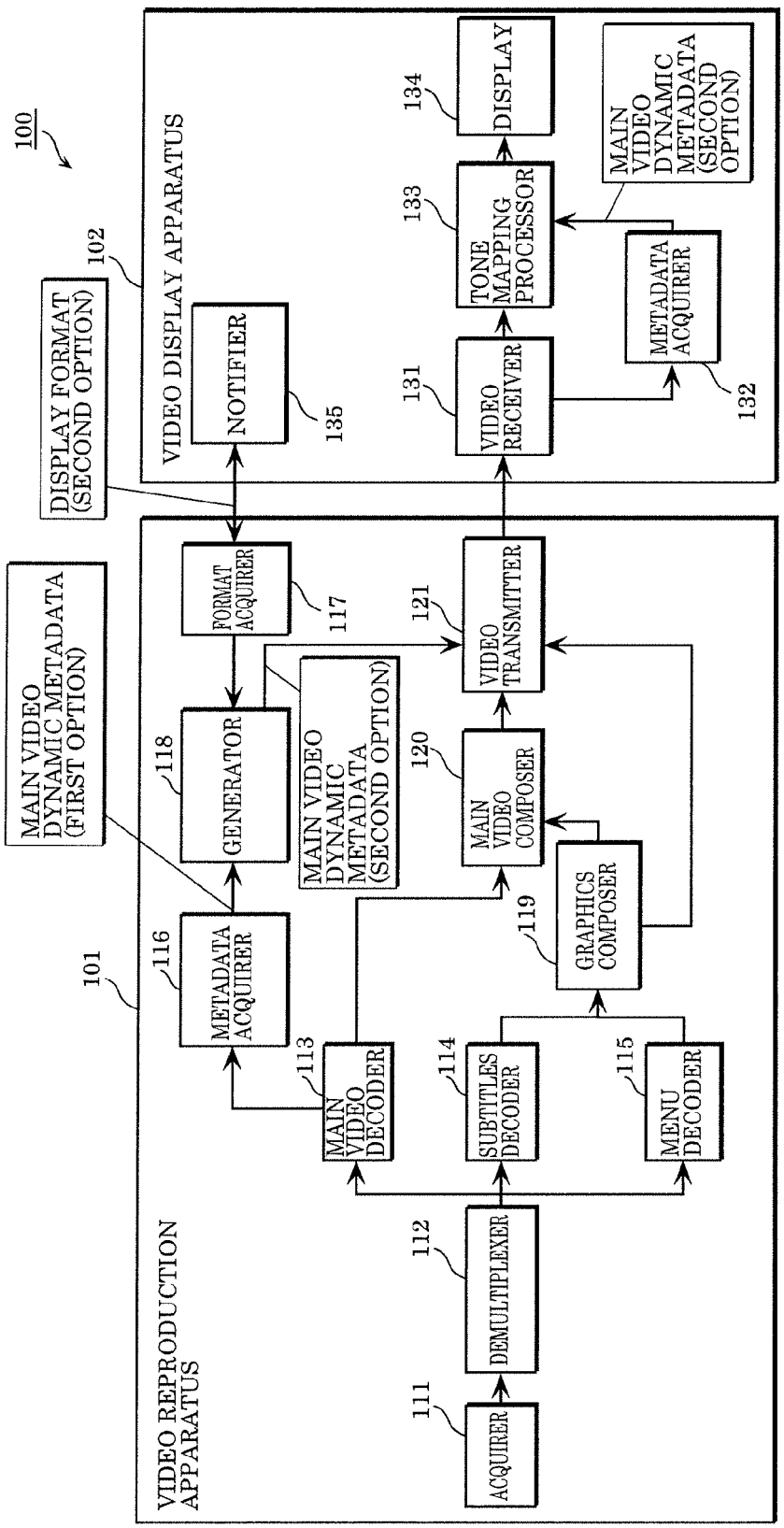
FIG. 10 is a block diagram showing a configuration of a video processing system according to Embodiment 1.

FIG. 10 is a block diagram showing a configuration of video processing system 100 according to Embodiment 1. Video processing system 100 shown in FIG. 10 includes video reproduction apparatus 101 and video display apparatus 102.

Video reproduction apparatus 101 reproduces a video, and outputs the obtained video to video display apparatus 102. Video reproduction apparatus 101 includes acquirer 111, demultiplexer 112, main video decoder 113, subtitles decoder 114, menu decoder 115, metadata acquirer 116, format acquirer 117, generator 118, graphics composer 119, main video composer 120, and video transmitter 121.

Acquirer 111 acquires a video signal. For example, in the case where video reproduction apparatus 101 is a disc reproduction apparatus, acquirer 111 acquires a video signal by reproducing a disc. In the case where video reproduction apparatus 101 is a broadcast reception apparatus, acquirer 111 acquires a video signal by receiving a broadcast wave. In the case where video reproduction apparatus 101 is an internet broadcast reception apparatus, acquirer 111 acquires a video signal by receiving an internet broadcast.

Demultiplexer 112 outputs a main video signal, a subtitles signal, and a menu signal that have been encoded and included in the video signal to main video decoder 113, subtitles decoder 114, and menu decoder 115, respectively.

Main video decoder 113 decodes the encoded main video signal output from demultiplexer 112.

Subtitles decoder 114 decodes the encoded subtitles signal output from demultiplexer 112. Also, subtitles decoder 114 determines whether or not to display subtitles based on a user's operation or the like, and selects the type of subtitles to be displayed. Subtitles decoder 114 outputs the selected subtitles to graphics composer 117 when displaying the subtitles.

Menu decoder 115 decodes the encoded menu signal output from demultiplexer 112. Also, menu decoder 115 determines whether or not to display a menu based on a user's operation or the like, and selects the type of menu to be displayed. Menu decoder 115 outputs the selected menu to graphics composer 117 when displaying the menu. Menu decoder 115 may compose and display a menu by using, not only information from the video signal, but also a program that runs on video reproduction apparatus 101.

Metadata acquirer 116 acquires main video dynamic metadata. For example, metadata acquirer 116 generates main video dynamic data based on information included in the main video signal. The description will be given assuming that main video dynamic metadata corresponding to the first option is acquired by metadata acquirer 116.

Format acquirer 117 acquires, from video display apparatus 102, a display format indicating a luminance dynamic range format displayable by video display apparatus 102. Here, the option of the HDR format supported by the display format of video display apparatus 102 is a second option, and thus format acquirer 117 acquires a display format indicating the second option.

The format (first option) supported by the main video dynamic metadata acquired by metadata acquirer 116 and the display format (second option) acquired by format acquirer 117 are different, and thus generator 118 generates a second option portion from the first option portion of the main video dynamic metadata. Then, generator 118 replaces the first option portion of the main video dynamic metadata with the generated second option portion, or adds the generated second option portion to the main video dynamic metadata. In this way, in the case where the luminance dynamic range format of the video indicated by the video data is different from the display format of the video display apparatus, generator 118 converts the format of the main video dynamic metadata to the display format.

Graphics composer 119 generates graphics information by composing subtitles and menus. As described above, graphics composer 119 may convert the resolution of subtitles and menus. For example, in the case of Ultra HD Blu-ray, graphics composer 119 may convert subtitles and menus in HD resolution to subtitles and menus in UHD resolution.

Also, graphics composer 119 generates graphics information. In the case where the generated graphics information is overlaid on the main video, graphics composer 119 sets graphics luminance information as a value other than "0" or a "value indicating that there are graphics", and transmits the graphics luminance information to video transmitter 121. In the case where the generated graphics information is not overlaid on the main video, graphics composer 119 sets graphics luminance information as "0" or a "value indicating that there are no graphics", and transmits the graphics luminance information to video transmitter 121. The graphics luminance information may be generated by a program installed on video reproduction apparatus 101, or by any other means.

Main video composer 120 generates a video signal by overlaying the graphics information generated by graphics composer 119 on the main video obtained by main video decoder 113.

Video transmitter 121 transmits the video signal generated by main video composer 120 and dynamic metadata to video display apparatus 102 via the video signal transmitting means such as an HDMI cable. The dynamic metadata includes the main video dynamic metadata acquired by metadata acquirer 116 and the graphics luminance information generated by graphics composer 119. That is, video transmitter 121 outputs the main video dynamic metadata including the second option portion generated by generator 118 to video display apparatus 102.

Next, a configuration of video display apparatus 102 will be described. Video display apparatus 102 includes video receiver 131, metadata acquirer 132, tone mapping processor 133, display 134, and notifier 135.

Video receiver 131 receives the video signal and the dynamic metadata transmitted from video reproduction apparatus 101. Video receiver 131 separates the video signal from the dynamic metadata, and transmits the video signal to tone mapping processor 133 and the dynamic metadata to metadata acquirer 132.

Metadata acquirer 132 transmits the main video dynamic metadata included in the dynamic metadata and the graphics luminance information to tone mapping processor 133 as a control signal.

Tone mapping processor 133 performs a tone mapping process on the video signal in accordance with the main video dynamic metadata. Tone mapping processor 133 performs a tone mapping process of converting the luminance of the main video by using conversion characteristics according to the second option portion of the dynamic metadata supported by the output display format. Specifically, when the graphics luminance information indicates "0" or a "value indicating that there are no graphics", tone mapping processor 133 performs a tone mapping process (dynamic tone mapping process) on the video signal in accordance with the main video dynamic metadata. On the other hand, when the graphics luminance information indicates a value other than "0" or a "value indicating that there are graphics", tone mapping processor 133 performs a tone mapping process so as to reduce the influence of dynamic tone mapping on the overlaid graphics. Display 134 displays the video signal that has undergone the tone mapping process.

Notifier 135 transmits EDID including the display format of video display apparatus 102 to video reproduction apparatus 101. For example, upon receiving a request to transmit EDID from video reproduction apparatus 101, notifier 135 transmits EDID to video reproduction apparatus 101 via the video signal transmitting means such as an HDMI cable.

2-2. Operations of Video Processing System

In the case where the first option portion and the second option portion of the dynamic metadata are configured as shown in FIGS. 9A and 9B, metadata acquirer 116 acquires the main video dynamic metadata including the first option portion and the mandatory portion of Option HDR based on the information included in the main video.

Figure 11A:
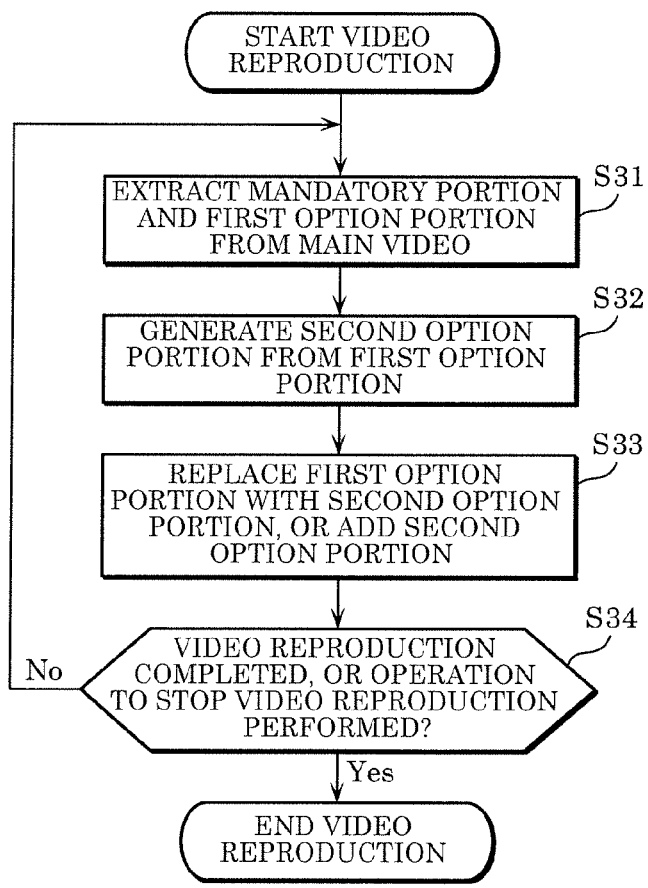
FIG. 11A is a flowchart illustrating the operations of a video reproduction apparatus according to Embodiment 1.

A flow of operations of video processing system 100 performed in this case will be described. FIG. 11A is a flowchart illustrating the operations of video reproduction apparatus 101 according to Embodiment 1.

After the reproduction of a video starts, in video reproduction apparatus 101, metadata acquirer 116 extracts, for each frame of the main video, the mandatory portion and the first option portion of the dynamic metadata from the main video (S31).

Then, generator 118 generates a second option portion from the first option portion of the dynamic metadata extracted by metadata acquirer 116 (S32).

Next, generator 118 replaces the first option portion of the main video dynamic metadata with the generated second option portion, or adds the generated second option portion to the main video dynamic metadata (S33). After that, generator 118 transmits the main video dynamic metadata including the mandatory portion and the second option portion to video transmitter 121. Then, video transmitter 121 transmits the main video dynamic metadata together with the main video to video display apparatus 102 via the video signal transmitting means.

Then, video reproduction apparatus 101 determines whether the reproduction of the video is completed or an operation to stop the reproduction of the video is performed (S34). If it is determined that the reproduction of the video is completed or an operation to stop the reproduction of the video is performed, video reproduction apparatus 101 ends the reproduction of the video. That is, video reproduction apparatus 101 repeats the processing operations of steps S31 to S34 until the reproduction of the video is completed or an operation to stop the reproduction of the video is performed. For example, the processing operations are repeatedly performed for each frame or every plurality of frames.

Figure 11B:
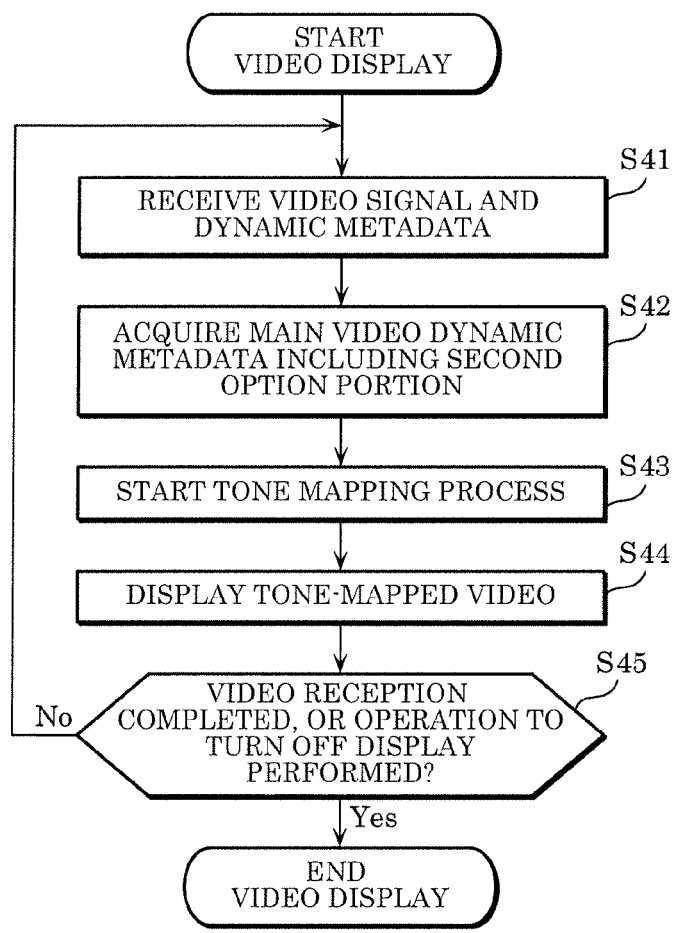
FIG. 11B is a flowchart illustrating the operations of a video display apparatus according to Embodiment 1.

FIG. 11B is a flowchart illustrating the operations of video display apparatus 102 according to Embodiment 1.

In video display apparatus 102, video receiver 131 receives the video signal and the dynamic metadata (S41). Video receiver 131 transmits the received video signal as the main video to tone mapping processor 133 and the dynamic metadata to metadata acquirer 132.

Metadata acquirer 132 acquires the main video dynamic metadata including the second option portion (S42).

Then, tone mapping processor 133 starts a tone mapping process according to the second option portion at the same time when the display of the video starts (S43).

After that, display 134 displays the video that has undergone the tone mapping process of tone mapping processor 133 (S44).

Then, video display apparatus 102 determines whether or not the reception of the video is completed or an operation to turn off the display is performed (S45). If it is determined that the reception of the video is completed or an operation to turn off the display is performed, video display apparatus 102 ends the display of the video. That is, video display apparatus 102 repeats the processing operations in steps S41 to S45 until the reception of the video is completed or an operation to turn off the display is performed. For example, the processing operations are repeatedly performed for each frame or every plurality of frames.

FIG. 12 is a diagram showing another configuration example of dynamic metadata. In FIG. 12, illustration of the elements that are not relevant to the present disclosure is omitted.

The configuration example of dynamic metadata shown in FIG. 12 is different from those of FIGS. 9A and 9B in that the mandatory portion, the first option portion, and the second option portion are specified by the item record position. In the case of the configuration example shown in FIG. 12, in the metadata as the first option portion, the second option portion has a value of "0" or a "value indicating invalidity". In the metadata as the second option portion, the first option portion has a value of "0" or a "value indicating invalidity". The first option portion and the second option portion may both have effective values.

Also, the generation of the second option portion from the first option portion of the dynamic metadata can be performed by, for example, converting the value of the first option to a value corresponding to the second option by using the data value distribution and the average data value based on the video specifications of the main video (the use of the main video corresponding to the first option and the use of the main video corresponding to the second option). In the case where RGB values are designated as data values in the first option portion, the first option portion can be completely converted to the second option portion. In both the dynamic metadata configuration shown in FIGS. 9A and 9B and the dynamic metadata configuration shown in FIG. 12, the number of distribution information elements of the first option and the number of distribution information elements of the second option may not match. Even in such a case, if at least distribution information that is necessary to generate the second option portion is included in the first option portion, the first option portion can be converted directly to the second option portion. On the other hand, if distribution information that is necessary to generate the second option portion is not included in the first option portion, by using distribution information obtained by supplementing necessary distribution information from the distribution information of the first option, the first option portion can be converted to the second option portion.

3. Embodiment 2

Embodiment 2 will be described. Embodiment 1 is configured such that the second option portion corresponding to the display format of the video display apparatus is generated from the first option portion of the dynamic metadata of the main video, but the configuration is not limited thereto. In Embodiment 2, an example will be described in which the second option portion is generated from the main video. That is, in the present embodiment, in the case where a video display apparatus connected to a video reproduction apparatus via a video signal transmitting means such as an HDMI cable does not support a first option of a predetermined HDR format, but supports a second option of the predetermined HDR format, the video reproduction apparatus generates a second option portion of dynamic metadata from the main video to be reproduced by the video reproduction apparatus. Then, the video reproduction apparatus (i) replaces the first option portion of the dynamic metadata of the main video with the generated second option portion; or (ii) adds the generated second option portion to the acquired dynamic metadata. After that, the video reproduction apparatus transmits the dynamic metadata including the second option portion to the video display apparatus via the video signal transmitting means. The video display apparatus acquires the dynamic metadata including the second option portion, and executes dynamic tone mapping according to the second option of the predetermined HDR format by using the second portion of the acquired dynamic metadata.

3-1. Configuration of Video Processing System

Figure 13:
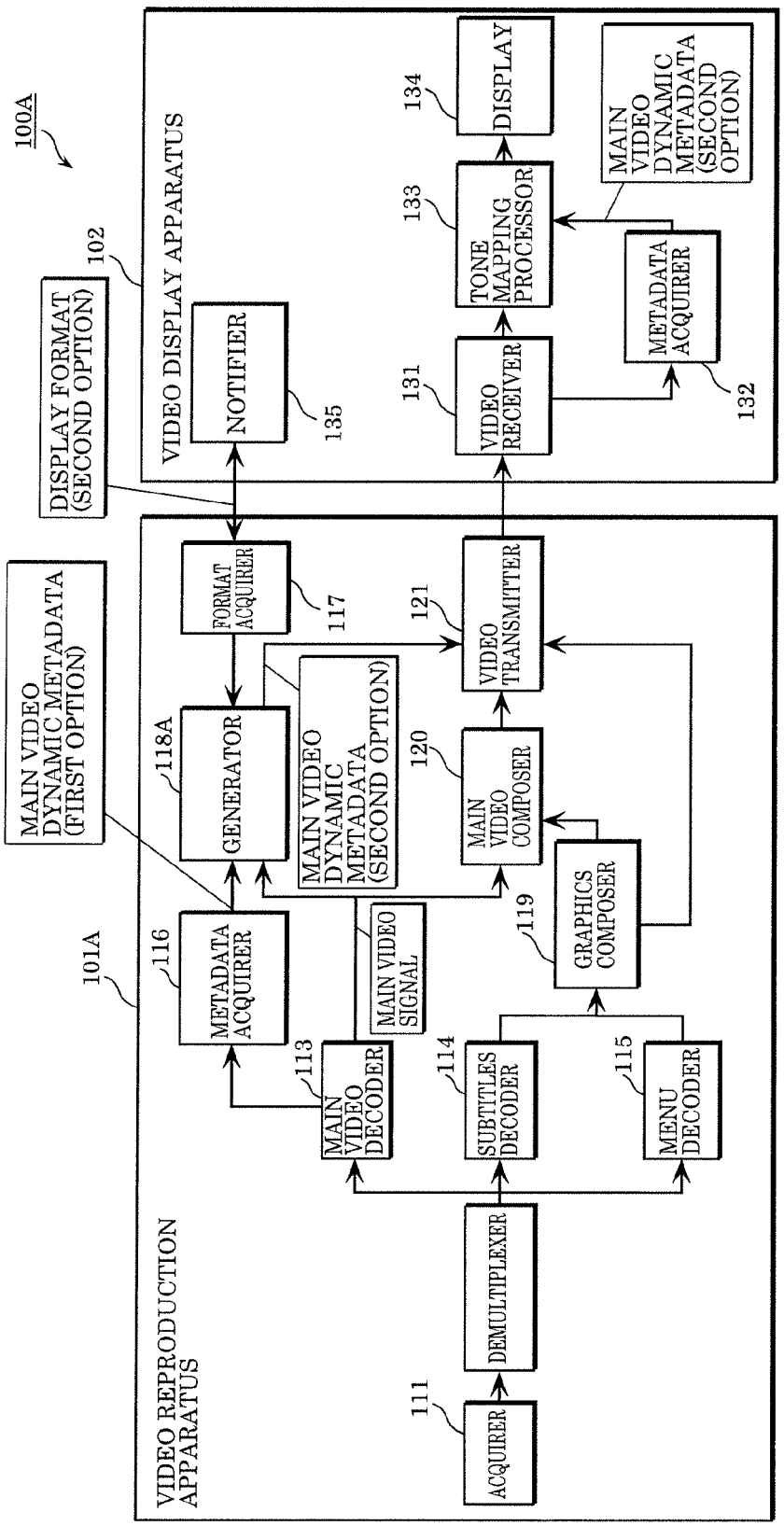
FIG. 13 is a block diagram showing a configuration of a video processing system according to Embodiment 2.

FIG. 13 is a block diagram showing a configuration of video processing system 100A according to Embodiment 2. Video reproduction apparatus 101A according to the present embodiment is different from video reproduction apparatus 101 according to Embodiment 1 in that the function of generator 118A is different. Other structural elements of video reproduction apparatus 101A are the same as those of video reproduction apparatus 101 according to Embodiment 1, and thus a detailed description thereof will be omitted.

The format (first option) supported by the main video dynamic metadata acquired by metadata acquirer 116 and the display format (second option) acquired by format acquirer 117 are different, and thus generator 118A generates a second option portion of dynamic metadata from the main video output from main video decoder 113. Then, generator 118A replaces the first option portion of the main video dynamic metadata with the generated second option portion, or adds the generated second option portion to the main video dynamic metadata. In this way, generator 118A extracts the dynamic metadata of the main data by analyzing the main video, and converts the luminance dynamic range format of the extracted dynamic metadata to the display format.

3-2. Operations of Video Processing System

In the case where the first option portion and the second option portion of the dynamic metadata are configured as shown in FIGS. 9A and 9B, metadata acquirer 116 acquires the main video dynamic metadata including the first option portion and the mandatory portion of Option HDR.

Figure 14:
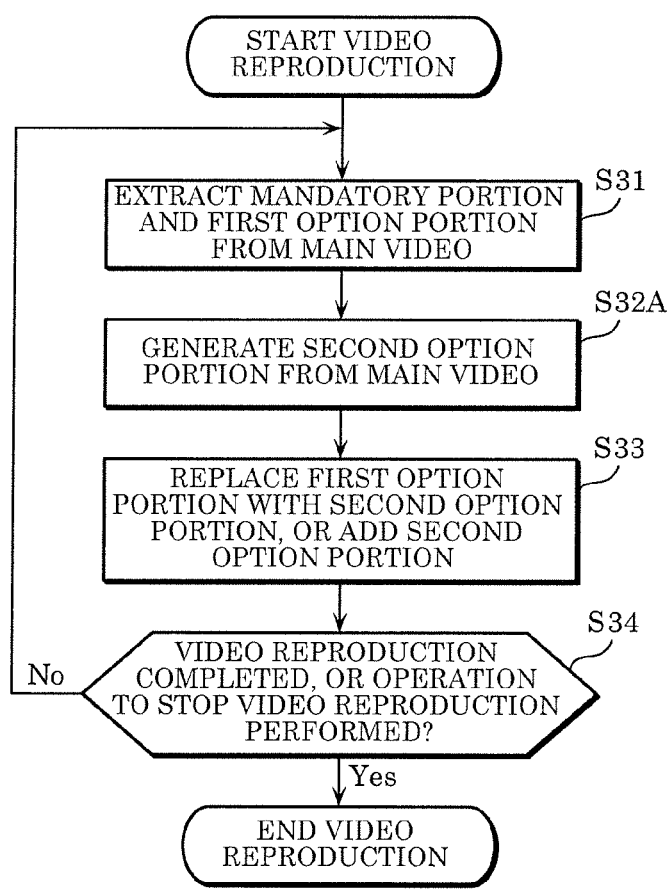
FIG. 14 is a flowchart illustrating the operations of a video reproduction apparatus according to Embodiment 2.

A flow of operations of video processing system 100A performed in this case will be described. FIG. 14 is a flowchart illustrating the operations of video reproduction apparatus 101A according to Embodiment 2. The operations of video reproduction apparatus 101A according to Embodiment 2 are different from the operations of video reproduction apparatus 101 according to Embodiment 1 in that step S32A is performed instead of step S32. Accordingly, only step S32A will be described, and a description of other steps will be omitted.

In video processing system 100A, after step S31, generator 118A analyzes the luminance characteristics of the main video output from main video decoder 113, and generates dynamic metadata corresponding to the second option (or in other words, a second option portion) from the result of the analysis (S32A).

After that, video reproduction apparatus 101A performs the same processing operations as those of step S33 and the subsequent steps shown in FIG. 11A.

As in the case of another configuration example of dynamic metadata shown in FIG. 12, in the metadata as the first option portion, the second option portion has a value of "0" or a "value indicating invalidity". In the metadata as the second option portion, the first option portion has a value of "0" or a "value indicating invalidity". The first option portion and the second option portion may both have effective values.

Also, the generation of the second option portion of dynamic metadata from the main video can be performed by, for example, for each frame of the main video, acquiring the luminance values of all pixel data of the main video, obtaining the distribution thereof through statistical processing, and performing calculation according to the specification of the second option.

In the data of the main video, in the case where the values of the second option are defined as code values indicating the luminance values of displayed luminance, the second option portion of dynamic metadata may be determined in the manner described below. In this case, the data of the main video includes code values associated with predetermined luminance values in input/output characteristics (EOTF: Electro-Optical Transfer Function) specified by the HDR format when display processing is performed in accordance with EOTF.

Accordingly, first, the processing in accordance with EOTF is performed so as to convert the code values of the main video to luminance values, and statistical processing is performed using the luminance values obtained by the conversion. Then, calculation is performed in accordance with the specification of the second option by using the result of the statistical processing so as to obtain a second option portion of dynamic metadata.

4. Embodiment 3

Embodiment 3 will be described. Embodiments 1 and 2 are configured such that the second option portion corresponding to the display format of the video display apparatus is generated by the video reproduction apparatus, but in Embodiment 3, an example will be described in which the second option portion is generated by the video display apparatus. That is, in the present embodiment, in the case where a video display apparatus connected to a video reproduction apparatus via a video signal transmitting means such as an HDMI cable does not have the display processing function of displaying a main video corresponding to a first option of a predetermined HDR format, but has the processing function of processing a main video corresponding to a second option of the predetermined HDR format, the video reproduction apparatus reproduces the main video corresponding to the first option, and outputs a reproduction signal of the main video. The video display apparatus (i) generates a second option portion from the first option portion of the dynamic metadata transmitted together with the main video, (ii) generates a second option portion from the main video, or generates a second option portion by using the two methods (i) and (ii). Then, the video display apparatus executes dynamic tone mapping using the generated second option portion.

4-1. Configuration of Video Processing System of First Example

Figure 15:
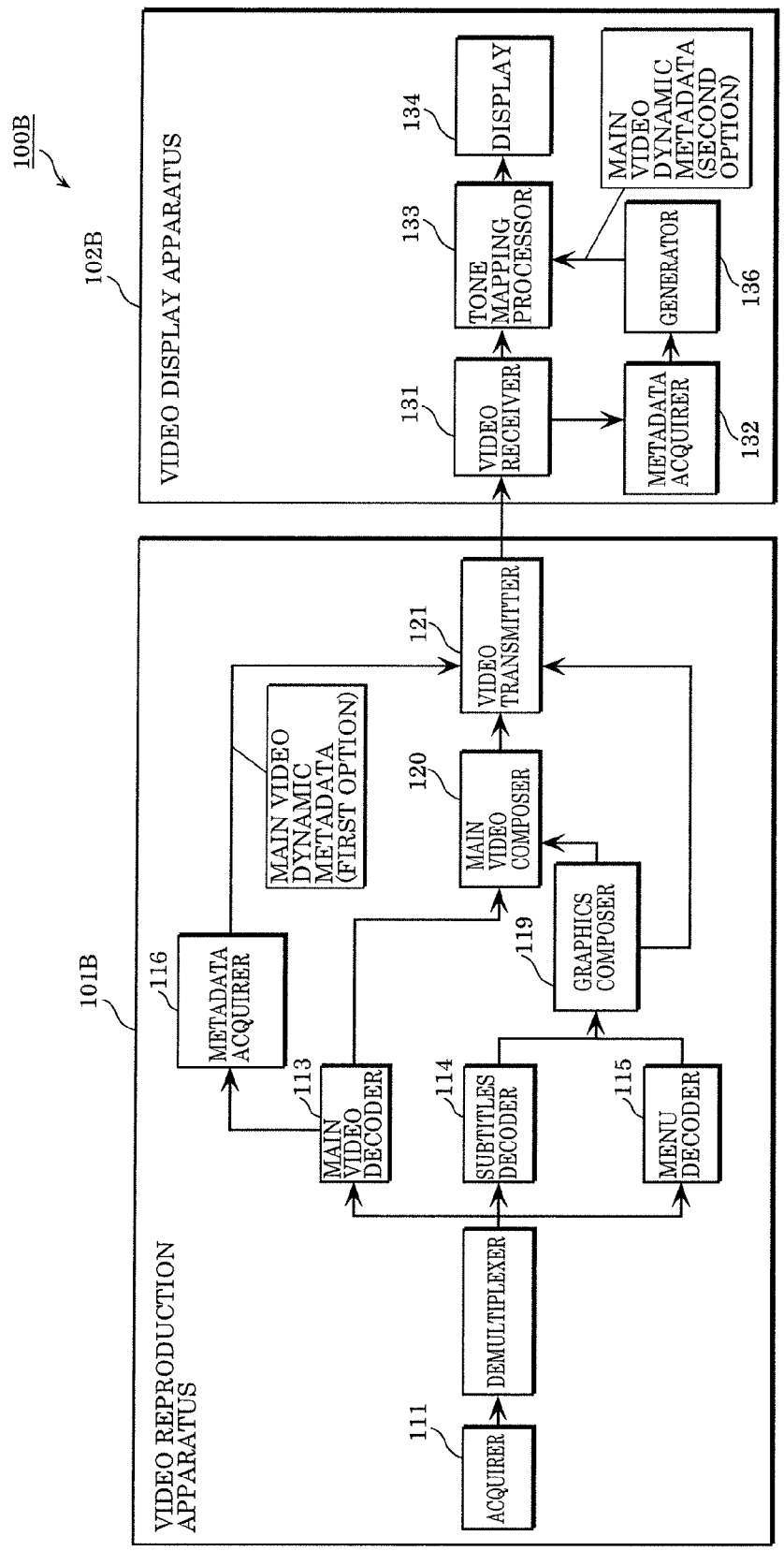
FIG. 15 is a block diagram showing a configuration of a video processing system according to a first example of Embodiment 3.

FIG. 15 is a block diagram showing a configuration of video processing system 100B according to a first example of Embodiment 3.

Video reproduction apparatus 101B according to the first example of the present embodiment is different from video reproduction apparatus 101 according to Embodiment 1 in that video reproduction apparatus 101B does not include format acquirer 117 and generator 118. Accordingly, video transmitter 121 transmits the video signal generated by main video composer 120 and the dynamic metadata including the first option portion to video display apparatus 102B via a video signal transmitting means such as an HDMI cable. Other structural elements of video reproduction apparatus 101B are the same as those of video reproduction apparatus 101 according to Embodiment 1, and thus a detailed description thereof is omitted here.

Also, video display apparatus 102B according to the first example of the present embodiment is different from video display apparatus 102 according to Embodiment 1 in that video display apparatus 102B further includes generator 136 but does not include notifier 135. Other structural elements of video display apparatus 102B are the same as those of video display apparatus 102 according to Embodiment 1, and thus a detailed description thereof is omitted here.

The format (first option) supported by the main video dynamic metadata acquired by metadata acquirer 132 and the display format (second option) are different, and thus generator 136 generates a second option portion from the first option portion of the main video dynamic metadata. Then, generator 136 replaces the first option portion of the main video dynamic metadata with the generated second option portion. In this way, in the case where the luminance dynamic range format of the video indicated by the video data is different from the display format of the video display apparatus, generator 136 converts the format of the main video dynamic metadata to the display format.

4-2. Operations of Video Processing System of First Example

First, video reproduction apparatus 101B transmits the main video dynamic metadata including the first option portion, together with the main video, to video display apparatus 102B via a video signal transmitting means such as an HDMI cable.

Figure 16:
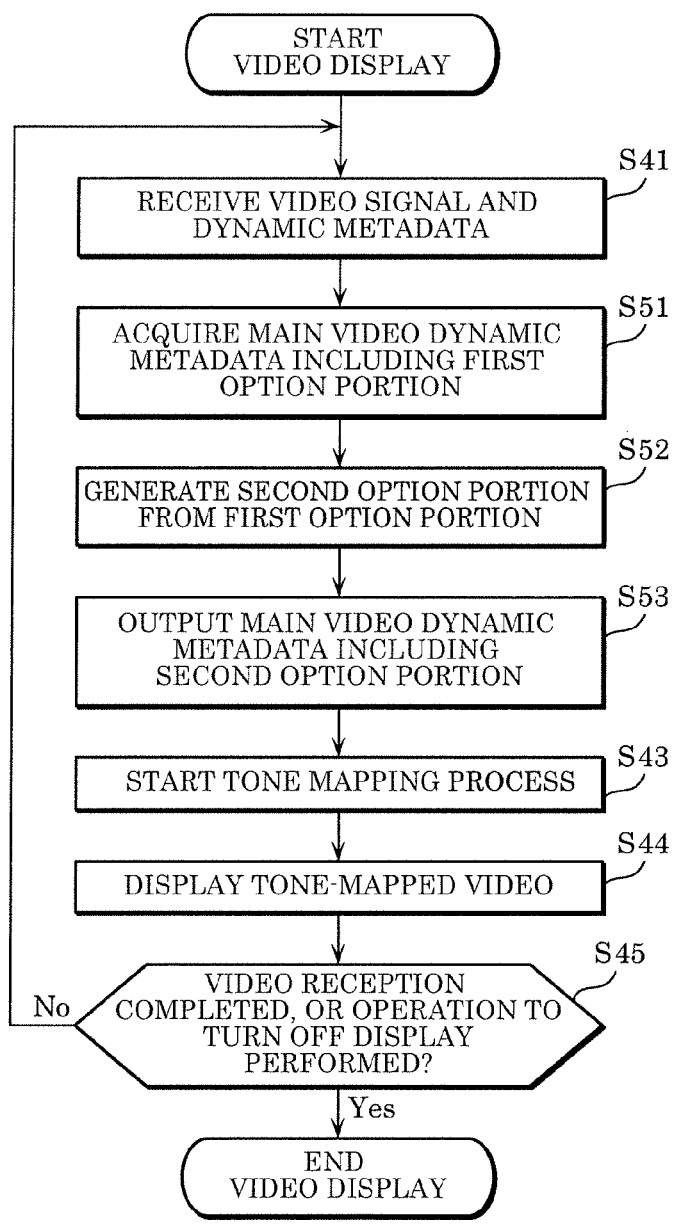
FIG. 16 is a flowchart illustrating the operations of a video display apparatus according to the first example of Embodiment 3.

FIG. 16 is a flowchart illustrating the operations of video display apparatus 102B according to the first example of Embodiment 3. The operations of video display apparatus 102B according to the first example of Embodiment 3 are different from those of video display apparatus 102 according to Embodiment 1 in that steps S51 to S53 are performed instead of step S42. Accordingly, only steps S51 to S53 will be described, and a description of other steps will be omitted.

In video display apparatus 102B, after step S41, metadata acquirer 132 acquires the main video dynamic metadata including the first option portion (S51).

Next, generator 136 generates a second option portion from the first option portion of the main video dynamic metadata (S52).

Then, generator 136 outputs main video dynamic data including the second option portion to tone mapping processor 133 (S53).

After that, steps S43 to S45 of video display apparatus 102 according to Embodiment 1 are performed. Video display apparatus 102B repeats the processing operations in steps S41, S51 to S53, and S43 to S45 until the reception of the video is completed or an operation to turn off the display is performed. For example, the processing operations are repeatedly performed for each frame or every plurality of frames.

4-3. Configuration of Video Processing System of Second Example

Figure 17:
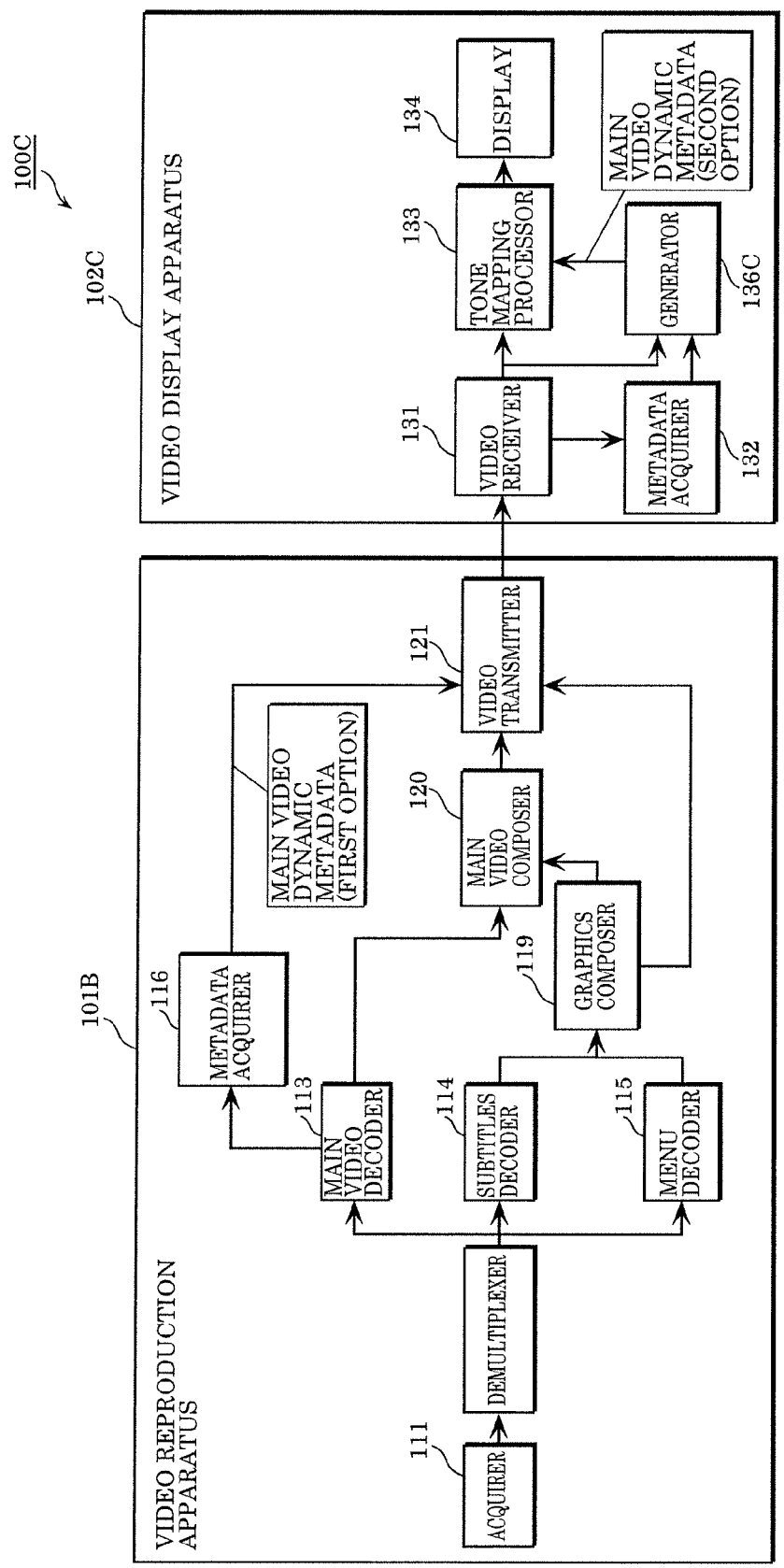
FIG. 17 is a block diagram showing a configuration of a video processing system according to a second example of Embodiment 3.

FIG. 17 is a block diagram showing a configuration of video processing system 100C according to a second example of Embodiment 3.

Video processing system 100C according to the second example of the present embodiment is different from video display apparatus 102B of video processing system 100C according to the first embodiment in that generator 136C of video display apparatus 102C has a different function. Other structural elements of video display apparatus 102C are the same as those of video display apparatus 102B according to the first example, and thus a detailed description thereof will be omitted.

The format (first option) supported by the main video dynamic metadata acquired by metadata acquirer 132 and the display format (second option) are different, and thus generator 136C generates a second option portion of the dynamic metadata from the main output from video receiver 131. Then, generator 136C replaces the first option portion of the main video dynamic metadata with the generated second option portion. In this way, generator 136C extracts the dynamic metadata of the main video by analyzing the main video, and converts the luminance dynamic range format of the extracted dynamic metadata to the display format.

4-4. Operations of Video Processing System of Second Example

Figure 18:
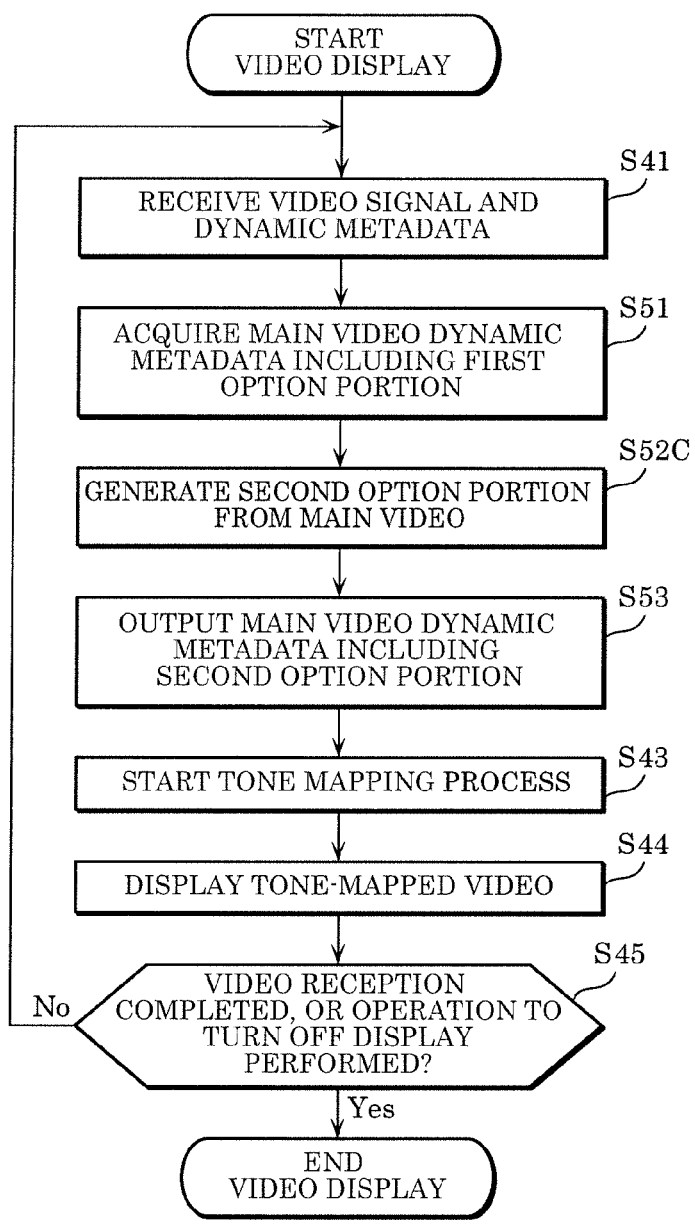
FIG. 18 is a flowchart illustrating the operations of a video display apparatus according to the second example of Embodiment 3.

FIG. 18 is a flowchart illustrating the operations of video display apparatus 102C according to a second example of Embodiment 3. The operations of video display apparatus 102C according to the second example of Embodiment 3 are different from those of video display apparatus 102B according to the first example in that step S52C is performed instead of step S52. Accordingly, only step S52C will be described, and a description of other steps will be omitted.

In video display apparatus 102C, after step S51, generator 136C analyzes the luminance characteristics of the main video output from video receiver 131, and generates dynamic metadata corresponding to the second option (or in other words, a second option portion) from the result of the analysis (S52C).

After that, video display apparatus 102C performs the same processing operations as those of step S53 and the subsequent steps shown in FIG. 16.

5. Embodiment 4

Embodiment 4 will be described. In Embodiment 4, in addition to Embodiment 1 or 2, the video reproduction apparatus performs inclusion of graphics luminance information at the time of generating the second option portion of the dynamic metadata. That is, the video reproduction apparatus adds, to the second option portion, graphics luminance information of the graphics to be overlaid on the main video. The video display apparatus acquires the dynamic metadata including the second option portion, and performs, on a section in which the luminance of the main video corresponding to the second option is greater than or equal to the graphics luminance, a first tone mapping process of dynamically changing conversion characteristics according to the second option portion of that section by using the acquired dynamic metadata, and performs a second tone mapping process that uses constant conversion characteristics on a section in which the luminance of the main video corresponding to the second option is less (darker) than the graphics luminance.

5-1. Configuration of Video Processing System

Figure 19:
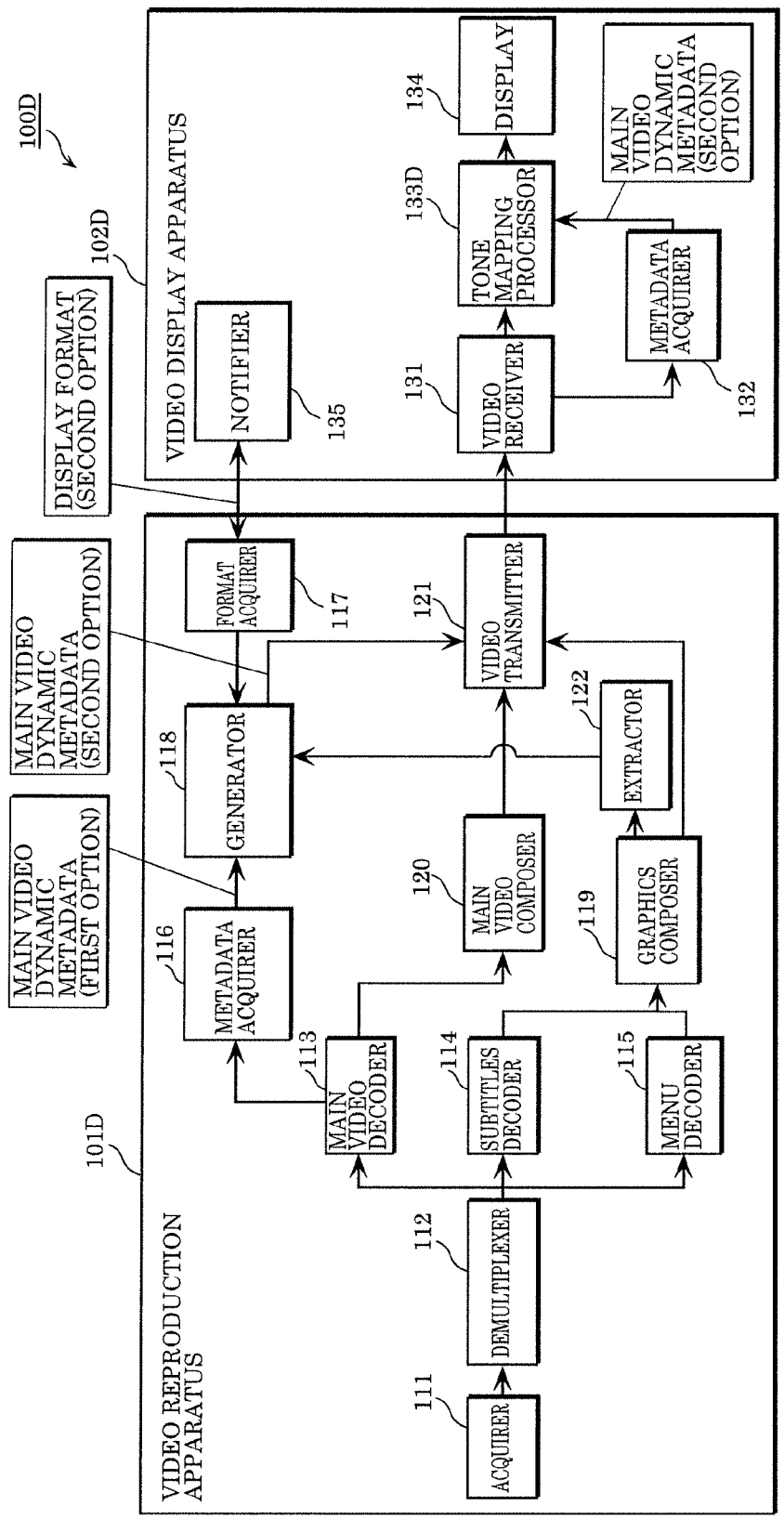
FIG. 19 is a block diagram showing a configuration of a video processing system according to Embodiment 4.

FIG. 19 is a block diagram showing a configuration of video processing system 100D according to Embodiment 4. Video reproduction apparatus 101D according to the present embodiment is different from video reproduction apparatus 101 according to Embodiment 1 in that video reproduction apparatus 101D further includes extractor 122. Other structural elements of video reproduction apparatus 101D are the same as those of video reproduction apparatus 101 according to Embodiment 1, and thus a detailed description thereof will be omitted.

Extractor 122 extracts graphics luminance characteristics.

Also, video display apparatus 102D according to the present embodiment is different from video display apparatus 102 according to Embodiment 1 in that tone mapping processor 133D has a different function. Other structural elements of video display apparatus 102D are the same as those of video display apparatus 102 according to Embodiment 1, and thus a detailed description thereof will be omitted.

Figure 20:
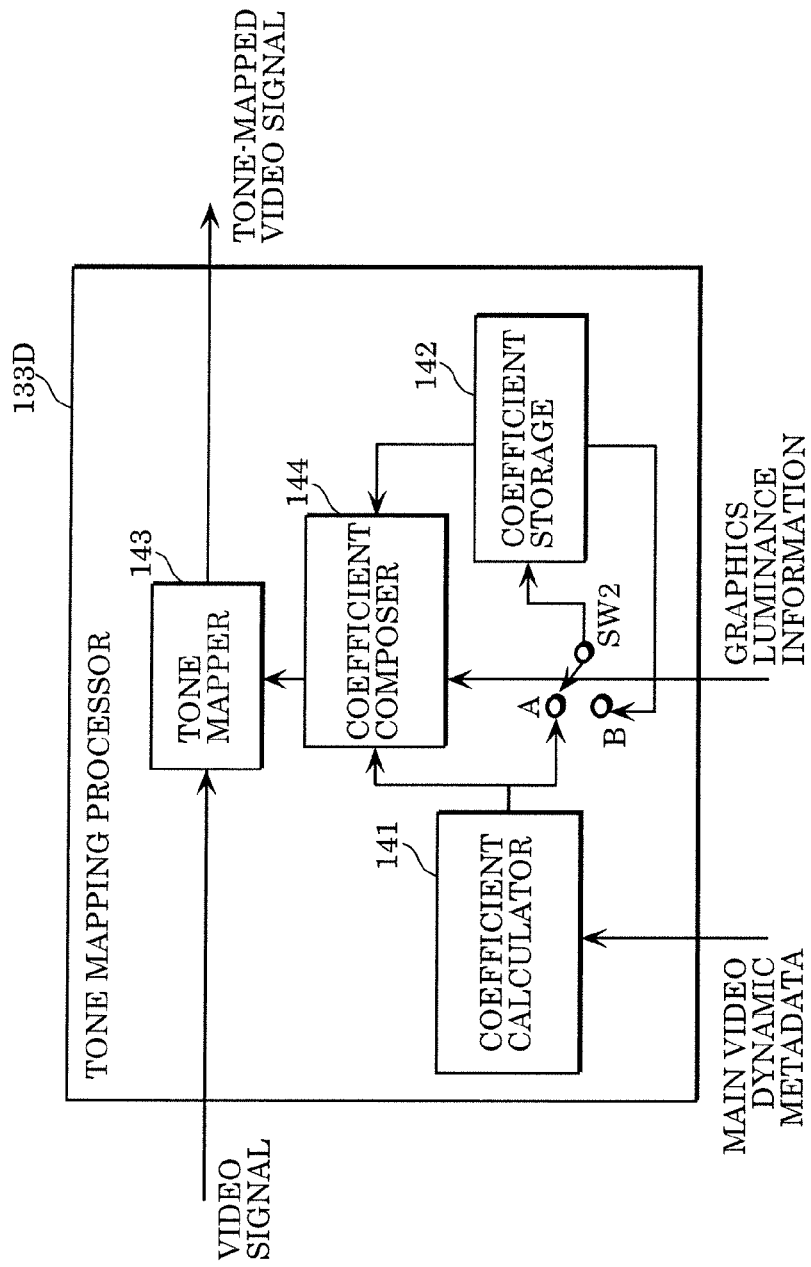
FIG. 20 is a block diagram showing a configuration of a tone mapping processor.

FIG. 20 is a block diagram showing a configuration of tone mapping processor 133D.

Tone mapping processor 133D includes coefficient calculator 141, coefficient storage 142, tone mapper 143, coefficient composer 144, and switch SW2.

The video signal from video receiver 131 is transmitted to tone mapper 143. The main video dynamic metadata from metadata acquirer 132 is transmitted to coefficient calculator 141.

Coefficient calculator 141 calculates a tone mapping coefficient used in the tone mapping process performed by tone mapper 143 according to video display capabilities such as the luminance of video display apparatus 102D. Coefficient storage 142 stores the tone mapping coefficient calculated by coefficient calculator 141. As used herein, the tone mapping coefficient refers to the coefficient included in a function that indicates conversion characteristics used in the tone mapping process. That is, the conversion characteristics are determined based on the tone mapping coefficient.

Switch SW2 selects one from a tone mapping coefficient (A) calculated by coefficient calculator 141 and a tone mapping coefficient (B) stored in coefficient storage 142, and inputs the selected tone mapping coefficient to coefficient storage 142. That is, switch SW2 switches between (A) updating the tone mapping coefficient stored in coefficient storage 142 with the tone mapping coefficient newly calculated by coefficient calculator 141 and (B) continuously storing the currently stored tone mapping coefficient.

Coefficient composer 144 performs a dynamic tone mapping process by using the tone mapping coefficient calculated by coefficient calculator 141 when the graphics luminance information indicates "0" or a "value indicating that there are no graphics". On the other hand, when the graphics luminance information indicates a value other than "0" or a "value indicating that there are graphics", or in other words, when the graphics luminance information indicates that graphics are overlaid, coefficient composer 144 compares the graphics luminance indicated by the graphics luminance information and the luminance indicated by the second option portion of the dynamic metadata. Then, when the luminance of the main video corresponding to the second option is greater than or equal to the graphics luminance, coefficient composer 144 performs a first tone mapping process of dynamically changing the conversion characteristics according to the second option portion. When the luminance of the main video corresponding to the second option is less (darker) than the graphics luminance, coefficient composer 144 performs any one of the following processing operations of; (1) fixing tone mapping; (2) not performing a tone mapping process; (3) suppressing variation of tone mapping; and (4) making the influence of tone mapping imperceptible to human. As used herein, the graphics luminance refers to a luminance higher than, for example, the maximum luminance value used in graphics. With this configuration, the variation of tone mapping in the luminance range used in graphics is suppressed. Also, in the processing described above, in order to maintain continuity between the conversion characteristics greater than or equal to the border luminance and the conversion characteristics less than the border luminance, coefficient composer 144 may correct the conversion characteristics in these border regions such that the conversion characteristics vary smoothly.

With this configuration, a portion on which graphics are overlaid can be displayed stably.

Also, the configuration described here is merely an example, and thus tone mapping processor 133D may be configured to, when the graphics luminance information indicates that graphics are overlaid, fix the tone mapping coefficient at a specific luminance or less, or not perform a tone mapping process.

That is, with respect to a first section of the video in which the second option portion of dynamic metadata as first dynamic luminance characteristics has a luminance greater than or equal to the graphics luminance, tone mapping processor 133D performs a first tone mapping process of dynamically changing the luminance of the main video in the first section based on the conversion characteristics according to the first dynamic luminance characteristics in the first section. Also, with respect to a second section of the video in which the second option portion of dynamic metadata has a luminance less than the graphics luminance characteristics, tone mapping processor 133D performs a second tone mapping process of changing the luminance of the main video in the second section based on constant conversion characteristics irrespective of the graphics luminance in the second section.

FIG. 21 is a diagram showing a configuration example of dynamic metadata according to Embodiment 4. In FIG. 21, illustration of the elements that are not relevant to the present disclosure is omitted.

The configuration example of dynamic metadata shown in FIG. 21 is different from that shown in FIGS. 9A, 9B, and 12 in that graphics luminance information is added. The value of the graphics luminance information indicates the effective maximum luminance of graphics (or in other words, subtitles or a menu) overlaid on the main video. When the graphics luminance information indicates "0" or a "value indicating that there are no graphics", video display apparatus 102D performs dynamic tone mapping according to the dynamic metadata. On the other hand, when the graphics luminance information indicates a value other than "0" or a "value indicating that there are graphics", video display apparatus 102D performs dynamic tone mapping on a section of the main video that has a luminance greater than or equal to the luminance of the graphics luminance information, and fixes tone mapping on a section of the main video that has a luminance less than the graphics luminance.

The graphics luminance information may be a portion of the luminance value distribution of the tone mapping information of the second option. As the graphics luminance information, for example, a luminance value that is defined as the knee point may be used. In this case, a graphics process and a normal dynamic tone mapping process can be made common by video display apparatus 102D. That is, at a luminance less than or equal to the luminance designated by the knee point, not performing tone mapping is set as an expected value, and thus video display apparatus 102D does not perform tone mapping at a luminance less than or equal to the graphics luminance. Accordingly, even when graphics are overlaid, video display apparatus 102D can display a portion on which the graphics are overlaid at a stable luminance.

5-2. Advantageous Effects

Figure 22A:
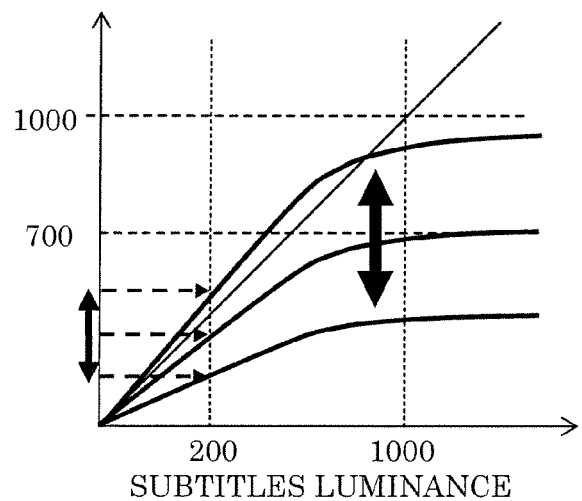
FIG. 22A is a diagram showing a variation in the luminance of subtitles in conventional dynamic tone mapping in the case where graphics are subtitles.

FIG. 22A is a diagram showing a variation in the luminance of subtitles in conventional dynamic tone mapping in the case where graphics are subtitles. In the case of the subtitles luminance level being 200 nits or less, when the tone mapping varies with time, as can be seen from FIG. 22A, the luminance at a level from 0 to near 200 nits also varies, and the subtitles luminance that essentially needs to be constant varies.

In contrast, by setting a predetermined luminance to a fixed value and performing tone mapping on a luminance that exceeds the predetermined luminance, the occurrence of variation in tone mapping with time can be prevented with respect to a luminance less than or equal to the predetermined border luminance. Accordingly, as can be seen from FIG. 22B, there is no variation with time below a level of 200 nits, which is the subtitles luminance, and thus the subtitles are displayed at a stable luminance level. Here, the predetermined luminance is, for example, a fixed value that is higher than the luminance level of ordinary subtitles, and the knee point of the conversion characteristics is also fixed.

However, when the predetermined luminance is fixed, a problem arises in that the range of variation of dynamic tone mapping is limited, and advantageous effects of dynamic tone mapping on the main video are reduced. The problem becomes prominent particularly when the maximum luminance (DPL) of video display apparatus 102 is low. It is of course possible to enhance the advantageous effects of dynamic tone mapping by devising the dynamic tone mapping method such as setting the luminance of graphics data to a predetermined value or less in video display apparatus 102. However, in this case, there is a problem in that, when graphics data having a luminance higher than the set luminance is displayed, the display of the graphics data is susceptible to the influence of dynamic tone mapping.

Figure 22B:
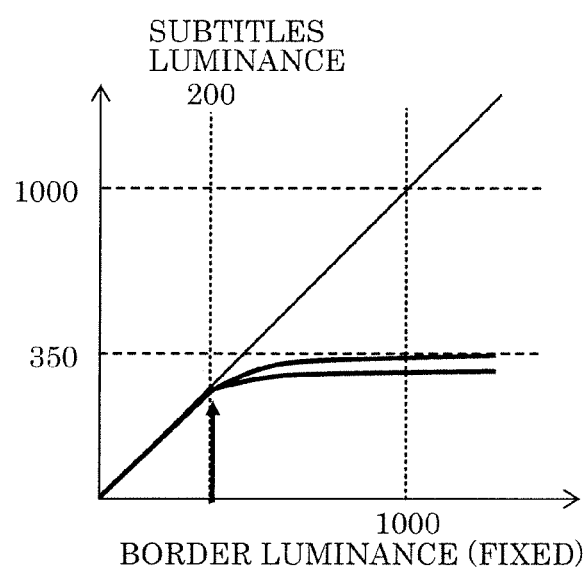
FIG. 22B is a diagram showing a luminance variation in tone mapping.
Figure 23:
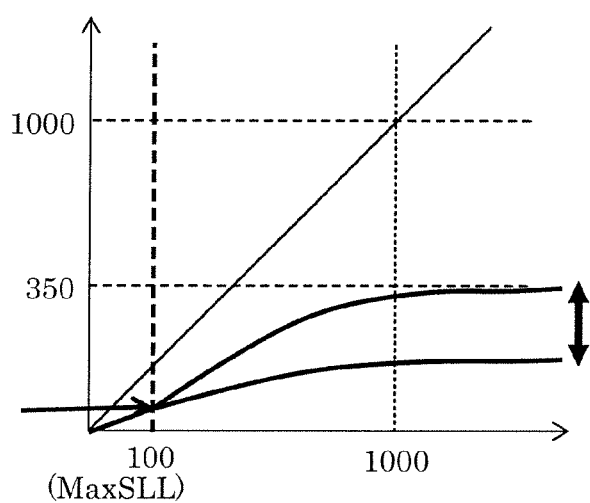
FIG. 23 is a diagram showing a luminance variation in tone mapping.

To address this, in order to change the predetermined luminance based on the subtitles luminance information, as shown in FIG. 23, dynamic tone mapping having an even higher degree of freedom can be applied to the main video. FIG. 23 shows a case where the actual subtitles luminance is 100 nits. As shown in FIG. 23, in this case, dynamic tone mapping having an even higher degree of freedom can be implemented as compared with the case where processing is performed by fixing the border luminance to 200 nits as shown in FIG. 22B. Such an advantageous effect increases as the maximum luminance of video display apparatus 102D to which the video reproduction apparatus is connected is lower.

6. Embodiment 5

Embodiment 5 will be described. In Embodiment 5, a case will be considered in which a video reproduction apparatus supports a plurality of HDR formats in which dynamic tone mapping can be performed. In the case where the main video supports a first HDR format that is one of a plurality of HDR formats, and a video display apparatus connected to the video reproduction apparatus supports a second HDR format that is another one of the plurality of HDR formats, at the time of reproducing the main video, the video reproduction apparatus dynamically generates, from the main video that is being reproduced, dynamic metadata that is needed in the second HDR format supported by the video display apparatus, and transmits the generated dynamic metadata to the video display apparatus. As a result, the video display apparatus acquires the main video and the dynamic metadata corresponding to the second HDR format, and displays the acquired main video in the second HDR format by using the acquired dynamic metadata.

6-1. Configuration of Video Processing System

Figure 24:
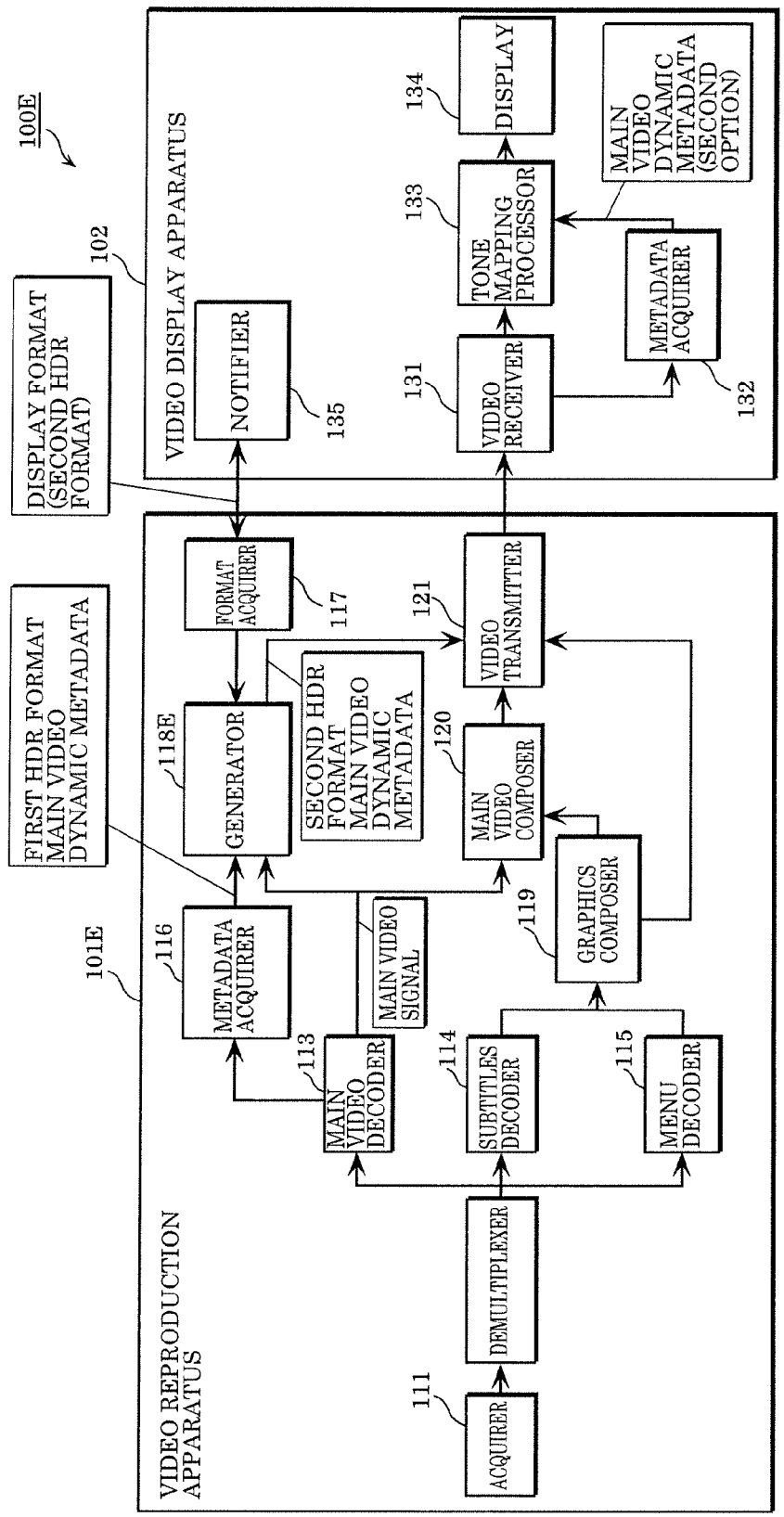
FIG. 24 is a block diagram showing a configuration of video processing system 100E according to Embodiment 5.

FIG. 24 is a block diagram showing a configuration of video processing system 100E according to Embodiment 5. Video reproduction apparatus 101E according to the present embodiment is different from video reproduction apparatus 101A according to Embodiment 2 in that generator 118E has a different function. Other structural elements of video reproduction apparatus 101E are the same as those of video reproduction apparatus 101A according to Embodiment 2, and thus a detailed description thereof will be omitted. Also, video display apparatus 102 has the same configuration as that of video display apparatus 102 according to Embodiments 1 and 2, and thus a detailed description thereof will be omitted.

First, the present embodiment will be described assuming that metadata acquirer 116 acquires main video dynamic metadata corresponding to the first HDR format. It is also assumed that format acquirer 117 acquires the display format indicated by the second HDR format because the HDR format supported by the display format of video display apparatus 102 is second HDR format.

The format (first HDR format) supported by the main video dynamic metadata acquired by metadata acquirer 116 and the display format (second HDR format) acquired by format acquirer 117 are different, and thus generator 118E generates dynamic metadata in the second HDR format from the main video output from main video decoder 113. Then, generator 118E replaces the dynamic metadata in the first HDR format with the generated main video dynamic metadata in the second HDR format, or adds the generated dynamic metadata in the second HDR format to the main video dynamic metadata. In this way, generator 118E extracts the dynamic metadata of the main video corresponding to the display format by analyzing the main video.

7. Variation

The details of Blu-ray and Ultra HD Blu-ray are disclosed in, for example,

Non-Patent Literature (NPL) 1.

The HDR video acquired by acquirer 111 may be a video on, for example, a Blu-ray disc, a DVD, a moving image delivery site on the Internet, a broadcast, or a HDD (Hard Disk Drive).

The video reproduction apparatus described above may be an apparatus that decodes a compressed video signal transmitted from a recording medium, a broadcast, or the Internet, and transmits the decoded video signal to a video display apparatus. Examples of the video reproduction apparatus include a disc player, a disc recorder, a set top box, a television set, a personal computer, and a smartphone. Also, video display apparatus 102 may have some or all of the functions of the video reproduction apparatus. For example, among the processors included in the video reproduction apparatus, video display apparatus 102 may include the processors other than acquirer 111. Also, video receiver 131, metadata acquirer 132, and tone mapping processor 133 or 133D included in video display apparatus 102 or 102D may be incorporated in the video reproduction apparatus. Also, among the processors included in tone mapping processor 133D, the video reproduction apparatus may include the processors other than tone mapper 143.

The video signal transmitting means that transmits the video signal from the video reproduction apparatus to the video display apparatus may be a means that transmits the video signal in an uncompressed state such as HDMI, DVI, or DP, or may be a means that transmits the video signal in a compressed form such as transmission via a network.

The maximum luminance information or the tone mapping information of the video display apparatus can be set in the video reproduction apparatus by a user inputting the information into the video reproduction apparatus via a remote controller or the like, or via an operating apparatus included in the video reproduction apparatus. Alternatively, the user may acquire these information via the Internet or any other means, store the acquired information in a portable storage medium, and transmit the information to the video reproduction apparatus via the portable storage medium. Alternatively, the video reproduction apparatus may be connected directly to the Internet such that the video reproduction apparatus can acquire these information from a database on a server. Furthermore, the video reproduction apparatus may display a test pattern on the video display apparatus such that these information can be acquired or stored, with the user confirming the characteristics of the video display apparatus by using the displayed test pattern.

The video reproduction apparatus may generate graphics luminance information (including subtitles luminance information and menu luminance information) by detecting the luminance of graphics (subtitles or a menu) from the data of the graphics, or may acquire the luminance of graphics created in advance during production of the video data. For example, the graphics luminance may be recorded in a disc, or may be transmitted as metadata via broadcasting or the Internet. The video reproduction apparatus reads the graphics luminance, and transmits the read graphics luminance to the video display apparatus as a portion of the dynamic metadata. Alternatively, the luminance information of graphics (subtitles or a menu) may be recorded in a database on a server that is connected to the Internet as information regarding the content to be reproduced such that the video reproduction apparatus can acquire the graphics luminance information from the database, and transmit the acquired graphics luminance information to the video display apparatus.

The metadata of the first option and the metadata of the second option may be provided in different descriptions that are different from the bit number and the number of items of the configuration examples, such as a coordinate system of a unit system of the values of the first option being different from a coordinate system of a unit system of the values of the second option.

In Embodiments 1 to 4, a case has been described in which the first option and the second option of the HDR format are different. However, the expression the HDR format being different also encompasses that the first option and the second option are different. That is, the first option of the HDR format may be defined as a first HDR format, and the second option of the HDR format may be defined as a second HDR format. Also, Mandatory HDR may be an HDR format that is different from the first option of the HDR format and the second option of the HDR format.

Up to here, the video processing systems according to the embodiments of the present disclosure have been described, but the present disclosure is not limited to the embodiments.

Also, the processors included in the video processing systems according to the embodiments described above are typically implemented as LSIs, which are integrated circuits. They may be individual single chips, or a part or all of them may be configured in a single chip.

Also, implementation of an integrated circuit is not limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Also, in each of the embodiments described above, the structural elements may be configured using dedicated hardware, or may be implemented by executing a software program suitable for the structural elements. The structural elements may be implemented by a program executor such as a CPU or a processor reading and executing a software program recorded in a recording medium such as a hard disk or a semiconductor memory.

Also, the present disclosure may be implemented as a method executed by the video processing system.

Also, the functional blocks shown in the block diagrams are merely examples. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

Also, the order in which the steps of each flowchart are performed is merely an example provided to specifically describe the present disclosure. Accordingly, the order is not limited to that described above. Also, one or more of the steps described above may be performed simultaneously with (in parallel to) other steps.

A video processing system according to one or more aspects has been described by way of embodiments above, but the present disclosure is not limited to the embodiments given above. Embodiments obtained by making various modifications that can be conceived by a person having ordinary skill in the art to the above embodiments as well as embodiments implemented by any combination of the structural elements of different embodiments without departing from the gist of the present disclosure may also be encompassed within the scope of one or more aspects.

INDUSTRIAL APPLICABILITY

The present disclosure is applicable to a video processing system, a video reproduction apparatus, or a video display apparatus.

The invention claimed is:

1. A video display apparatus, comprising:
an acquirer that acquires video data including a main video and a first luminance dynamic range format;
a determiner that determines whether the luminance dynamic range format is same as or different from a second luminance dynamic range format displayable by the video display apparatus;
a generator that generates first characteristics information that indicates first dynamic luminance characteristics by using the video data when the first luminance dynamic range format is different from the second luminance dynamic range format, the first dynamic luminance characteristics being dynamic luminance characteristics indicating a time-dependent change in luminance characteristics of the main video and correspond to the display format and being dynamic metadata;
tone mapping processor that performs a tone mapping process of converting a luminance of the main video based on conversion characteristics according to the first dynamic luminance characteristics indicated by the first characteristics information generated by the generator; and
a display that displays the main video that has undergone the tone mapping process, wherein:
the video data further includes second characteristics information that indicates the first dynamic luminance characteristics of the main video,
the generator generates the first characteristics information by converting a third luminance dynamic range format of second dynamic luminance characteristics indicated by the second characteristics information to the display format,
a format of the first characteristics information and a format of the second characteristics information are different from each other, and
the first dynamic luminance characteristics indicated in the first characteristics information and the second dynamic luminance characteristics indicated in the second characteristics information are equivalent.

2. The video display apparatus according to claim 1, wherein the generator generates the first characteristics information by analyzing the main video of the video data to extract second dynamic luminance characteristics indicating the first dynamic luminance characteristics of the main video, and converting a third luminance dynamic range format of the second dynamic luminance characteristics extracted to the display format.

3. The video display apparatus according to claim 1, further comprising:
a composer that generates a composite video by overlaying graphics on the main video; and
an extractor that extracts luminance characteristics of the graphics,
wherein, when the composite video is generated by the composer,
the tone mapping processor performs:
a first tone mapping process on a first section of the main video in which the first dynamic luminance characteristics indicated by the first characteristics information are greater than or equal to the luminance characteristics of the graphics, the first tone mapping process being processing of dynamically changing the luminance of the main video in the first section based on the conversion characteristics according to the first dynamic luminance characteristics in the first section; and
a second tone mapping process on a second section of the main video in which the first dynamic luminance characteristics are less than the luminance characteristics of the graphics, the second tone mapping process being processing of changing the luminance of the main video in the second section based on constant conversion characteristics irrespective of the first dynamic luminance characteristics in the second section.

4. A video display method in a video display apparatus, the video display method comprising:
acquiring video data including a main video and a first luminance dynamic range format;
determining whether the luminance dynamic range format is same as or different from a second luminance dynamic range format displayable by the video display apparatus; and
after it is determined that the luminance dynamic range format is different from the second luminance dynamic range format:
generating first characteristics information that indicates first dynamic luminance characteristics by using the video data, the first dynamic luminance characteristics being dynamic luminance characteristics indicating a time-dependent change in luminance characteristics of the main video and correspond to the display format and being dynamic metadata;
performing a tone mapping process of converting a luminance of the main video based on conversion characteristics according to the first dynamic luminance characteristics indicated by the first characteristics information generated in the generating of the first characteristics information; and
displaying the main video that has undergone the tone mapping process, wherein:
the video data further includes second characteristics information that indicates the first dynamic luminance characteristics of the main video, the first characteristics information is generated by converting a third luminance dynamic range format of second dynamic luminance characteristics indicated by the second characteristics information to the display format, a format of the first characteristics information and a format of the second characteristics information are different from each other, and the first dynamic luminance characteristics indicated in the first characteristics information and the second dynamic luminance characteristics indicated in the second characteristics information are equivalent.

5. A video display apparatus, comprising:

an acquirer that acquires video data including a main video;

a generator that generates first characteristics information that indicates first dynamic luminance characteristics by using the video data when a luminance dynamic range format of the main video indicated by the video data is different from a display format that indicates a luminance dynamic range format displayable by the video display apparatus, the first dynamic luminance characteristics being dynamic luminance characteristics indicating a time-dependent change in luminance characteristics of the main video and correspond to the display format;

tone mapping processor that performs a tone mapping process of converting a luminance of the main video based on conversion characteristics according to the first dynamic luminance characteristics indicated by the first characteristics information generated by the generator;

a display that displays the main video that has undergone the tone mapping process;

a composer that generates a composite video by overlaying graphics on the main video; and an extractor that extracts luminance characteristics of the graphics, wherein, when the composite video is generated by the composer, the tone mapping processor performs:

a first tone mapping process on a first section of the main video in which the first dynamic luminance characteristics indicated by the first characteristics information are greater than or equal to the luminance characteristics of the graphics, the first tone mapping process being processing of dynamically changing the luminance of the main video in the first section based on the conversion characteristics according to the first dynamic luminance characteristics in the first section; and a second tone mapping process on a second section of the main video in which the first dynamic luminance characteristics are less than the luminance characteristics of the graphics, the second tone mapping process being processing of changing the luminance of the main video in the second section based on constant conversion characteristics irrespective of the first dynamic luminance characteristics in the second section.

* * * * *